United States Patent
Hattori et al.

(10) Patent No.: US 10,279,805 B2
(45) Date of Patent: May 7, 2019

(54) VEHICLE MOVEMENT STATE DETERMINATION DEVICE AND VEHICLE MOVEMENT CONTROL DEVICE

(71) Applicant: TOYOTA JIDOSHA KABUSHIKI KAISHA, Toyota-shi, Aichi-ken (JP)

(72) Inventors: Tsutomu Hattori, Susono (JP); Hiroshi Onuma, Suntou-gun (JP); Akira Nagae, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 58 days.

(21) Appl. No.: 15/124,165

(22) PCT Filed: Mar. 17, 2015

(86) PCT No.: PCT/JP2015/058649
§ 371 (c)(1),
(2) Date: Sep. 7, 2016

(87) PCT Pub. No.: WO2015/141864
PCT Pub. Date: Sep. 24, 2015

(65) Prior Publication Data
US 2017/0015315 A1      Jan. 19, 2017

(30) Foreign Application Priority Data
Mar. 19, 2014  (JP) .................. 2014-056895

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |

(Continued)

(52) U.S. Cl.
CPC ..... *B60W 30/0953* (2013.01); *B60R 21/0132* (2013.01); *G05D 1/0055* (2013.01);
(Continued)

(58) Field of Classification Search
CPC . B60T 7/12; B60T 7/22; B60T 8/1755; B60T 2201/022; B60T 2201/16;
(Continued)

(56) References Cited

U.S. PATENT DOCUMENTS 5,627,756 A * 5/1997 Fukada ............... B60T 8/1755
                                                                 180/197
8,150,575 B2    4/2012 Ewerhart et al.
(Continued)

FOREIGN PATENT DOCUMENTS

DE    4436162 C1    3/1996
DE    10133170 A1   1/2002
(Continued)

*Primary Examiner* — Mahmoud S Ismail
(74) *Attorney, Agent, or Firm* — Sughrue Mion, PLLC

(57) ABSTRACT

A vehicle movement state determination device includes: a yaw rate determination unit configured to determine a yaw rate based on at least one of a detection yaw rate detected by a yaw rate sensor and a calculation yaw rate calculated by a yaw rate calculation unit; and a yaw rate reliability determination unit configured to determine whether a reliability of the detection yaw rate is low. The yaw rate determination unit determines the detection yaw rate as the yaw rate at the time the yaw rate reliability determination unit does not determine that the reliability of the detection yaw rate is low, and determines the yaw rate based on the calculation yaw rate at the time the yaw rate reliability determination unit determines that the reliability of the detection yaw rate is low.

5 Claims, 20 Drawing Sheets

(51) Int. Cl.
*G06F 17/00* (2019.01)
*B60W 30/095* (2012.01)
*B60R 21/0132* (2006.01)
*G05D 1/02* (2006.01)
*G06F 7/70* (2006.01)
*G06F 19/00* (2018.01)
*G06G 7/00* (2006.01)
*G06G 7/76* (2006.01)
*B60W 30/08* (2012.01)

(52) U.S. Cl.
CPC ..... *G05D 1/0212* (2013.01); *B60W 2030/082* (2013.01); *B60W 2520/105* (2013.01); *B60W 2520/14* (2013.01); *B60W 2720/14* (2013.01); *G05D 2201/0213* (2013.01)

(58) Field of Classification Search
CPC .. B60T 2220/03; B60T 2230/04; B60T 8/348; B60T 8/445; B60W 2520/14; B60W 30/08; B60W 30/09; B60W 40/114; B60W 30/045

USPC .................................................. 701/48, 70
See application file for complete search history.

(56) References Cited

U.S. PATENT DOCUMENTS

| | | |
|---|---|---|
| 8,386,124 B2 | 2/2013 | Ewerhart et al. |
| 8,958,953 B2 | 2/2015 | Stabrey |
| 9,085,286 B2 | 7/2015 | Lich et al. |
| 2014/0352396 A1* | 12/2014 | Rauh ................. G01D 5/24461 73/1.01 |

FOREIGN PATENT DOCUMENTS

| | | |
|---|---|---|
| DE | 102004004491 A1 | 8/2005 |
| GB | 2 368 400 A | 5/2002 |
| JP | 2008-528378 A | 7/2008 |
| JP | 2008-537920 A | 10/2008 |

\* cited by examiner

| COLLISION POSITION | |
|---|---|
| LQ (LEFT 25%) | RSF (RIGHT 70%) |
| LH (LEFT 40%) | RH (RIGHT 40%) |
| LSF (LEFT 70%) | RQ (RIGHT 25%) |
| F (100%) | |

| COLLISION POSITION | OWN VEHICLE SPEED |
|---|---|
| RELATIVE VEHICLE SPEED | ESTIMATION YAW RATE |

| COLLISION POSITION |
|---|
| E (ENGINE COMPARTMENT) |
| A (A-PILLAR) |
| B (B-PILLAR) |
| C (C-PILLAR) |
| L (LUGGAGE) |

FIG.20

| COLLISION POSITION | FAILURE SENSOR | USAGE SENSOR |
|---|---|---|
| LQ (LEFT 25%) | 4L | 4R, 6L, 6R |
| LH (LEFT 40%) | 4L, 4R | 6L, 6R |
| LSF (LEFT 70%) | 4L, 4R | 6L, 6R |
| F (100%) | 4L, 4R | 6L, 6R |
| RSF (RIGHT 70%) | 4L, 4R | 6L, 6R |
| RH (RIGHT 40%) | 4L, 4R | 6L, 6R |
| RQ (RIGHT 25%) | 4R | 4L, 6L, 6R |

FIG.21

| COLLISION POSITION | FAILURE SENSOR | USAGE SENSOR |
|---|---|---|
| E (ENGINE COMPARTMENT) | 4L, 4R | 6L, 6R |
| A (A-PILLAR) | 4L, 5L | 4R, 6L, 6R |
| B (B-PILLAR) | 5L, 6L | 4R, 4L, 6R |
| C (C-PILLAR) | 5L, 6L | 4R, 4L, 6R |
| L (LUGGAGE) | 6L | 4L, 4R, 6R |

| TTC | LAP RATIO (COLLISION POSITION: LQ/LH/LSF/F/RSF/RH/RQ) |
|---|---|
| RELATIVE VEHICLE SPEED | MAP OF "0/1" FOR DETERMINING FAILURE SENSOR OR USAGE SENSOR |

| | LAP RATIO (COLLISION POSITION: LQ/LH/LSF/F/RSF/RH/RQ) |
|---|---|
| TTC | RELATIVE VEHICLE SPEED THRESHOLD VALUE MAP FOR DETERMINING FAILURE SENSOR OR USAGE SENSOR |

FIG.24

| COLLISION POSITION | OWN VEHICLE SPEED |
|---|---|
| RELATIVE VEHICLE SPEED | MAP OF "0/1" FOR DETERMINING FAILURE SENSOR OR USAGE SENSOR |

FIG.25

| | LAP RATIO (COLLISION POSITION: E/A/B/C/L) |
|---|---|
| OWN VEHICLE SPEED | RELATIVE VEHICLE SPEED THRESHOLD VALUE MAP FOR DETERMINING FAILURE SENSOR OR USAGE SENSOR |

VEHICLE MOVEMENT STATE DETERMINATION DEVICE AND VEHICLE MOVEMENT CONTROL DEVICE

CROSS REFERENCE TO RELATED APPLICATIONS

This application is a National Stage of International Application No. PCT/JP2015/058649 filed Mar. 17, 2015, claiming priority based on Japanese Patent Application No. 2014-056895 filed Mar. 19, 2014, the contents of all of which are incorporated herein by reference in their entirety.

TECHNICAL FIELD

The present invention relates to a vehicle movement state determination device and a vehicle movement control device.

BACKGROUND ART

Hitherto, a technique of stabilizing a vehicle after a collision has been reported. For example, in a technique disclosed in Patent Literature 1, a yaw rate which is measured by a yaw rate sensor is verified by the evaluation of an acceleration sensor when a vehicle collides with an object. Then, in the technique disclosed in Patent Literature 1, a stabilization algorithm generates a yaw moment applying a counteraction to a yaw movement generated by the collision by using the yaw rate generated directly before the collision as a target value when the yaw rate measurement value or the yaw rate change value exceeds a threshold value.

CITATION LIST

Patent Literature

Patent Literature 1: Japanese Translation of PCT International Application Publication No. JP-T-2008-537920

DISCLOSURE OF INVENTION

Problems to be Solved by the Invention

Here, in order to stably maintain the vehicle position or the vehicle posture after a primary collision for reducing the secondary collision damage, there is a need to appropriately control a traveling state based on the vehicle movement state amount (for example, the yaw rate) at the time directly before the primary collision to the time directly after the primary collision. However, when an own vehicle contacts or collides with an obstacle outside the vehicle (for example, the other vehicle, a wall surface, or the like), the impact is large. For this reason, the vehicle movement state amount may exceed a normal detection range of a sensor (for example, a yaw rate sensor) for detecting the vehicle movement state amount or the sensor may be deformed or broken. For this reason, there is a time period in which the vehicle movement state amount may not be accurately detected in the event of the collision, and hence the vehicle movement may not be accurately controlled.

As an example, a yaw rate transition in the event of a collision will be described with reference to FIG. 1. In FIG. 1, the vertical axis indicates a detection yaw rate (deg/sec) which is detected by a yaw rate sensor as a vehicle movement control sensor mounted on the vehicle. The horizontal axis indicates the time which is counted from the time point (0 msec) at which an airbag acceleration sensor as a collision detection sensor detects the collision. As illustrated in FIG. 1, the detectable range of the yaw rate sensor is normally set to about ±100 deg/sec. This is because the resolution of the vehicle movement control yaw rate sensor needs to be a value higher than the resolution of the collision detection airbag acceleration sensor. In other words, it is not assumed that the vehicle movement control yaw rate sensor detects the yaw rate generated in the event of the collision within the detection range of the collision detection airbag acceleration sensor. For that reason, as illustrated in FIG. 1, the yaw rate falls within the detection range of the yaw rate sensor in 150 msec after the collision, but a yaw rate exceeding 100 deg/sec is generated at the time from 0 msec to 150 msec in the event of the collision. As a result, there is a time period in which the yaw rate exceeds the detection range of the yaw rate sensor.

In this way, there is a case in which the reliability of the detection value of the yaw rate sensor may be decreased due to the vehicle movement state or the like. In this case, the reliability of the vehicle movement control based on the detection result of the yaw rate sensor is also degraded.

For example, as illustrated in FIG. 1, there is a possibility that the yaw rate generated after the collision may be detected as a value which is smaller than the actual value exceeding the detectable range of the yaw rate sensor. Further, for example, when a vehicle abnormality occurs such that a tire bursts in the traveling state other than the collision, the vehicle movement state abruptly changes to the vehicle movement state which is not assumed in the detectable range of the yaw rate sensor. Accordingly, it may be considered that the yaw rate generated after the vehicle abnormality exceeds the detectable range of the yaw rate sensor. For that reason, when the movement control is performed by regarding the yaw rate detected after the collision or the vehicle abnormality as the actual yaw rate of the vehicle, there is a possibility that the movement control may be performed based on the small yaw rate.

The invention is made in view of the above-described circumstances, and an object thereof is to provide a vehicle movement state determination device and a vehicle movement control device capable of suppressing degradation in the reliability of a yaw rate determination result when the reliability of a detection value of a yaw rate sensor is low.

Solutions to the Problems

A vehicle movement state determination device according to the present invention includes a yaw rate sensor configured to detect a yaw rate generated in an own vehicle; an acceleration sensor configured to detect an acceleration generated in the own vehicle and is a sensor different from the yaw rate sensor; a yaw rate calculation means configured to calculate the yaw rate generated in the own vehicle based on the acceleration detected by the acceleration sensor; a yaw rate determination means configured to determine the yaw rate generated in the own vehicle based on at least one of a detection yaw rate detected by the yaw rate sensor and a calculation yaw rate calculated by the yaw rate calculation means; and a yaw rate reliability determination means configured to determine whether a reliability of the detection yaw rate is low. Here, the yaw rate determination means determines the detection yaw rate as the yaw rate generated in the own vehicle at the time the yaw rate reliability determination means does not determine that the reliability of the detection yaw rate is low, and determines the yaw rate based on the calculation yaw rate at the time the yaw rate reliability determination means determines that the reliability of the detection yaw rate is low.

Further, in the vehicle movement state determination device, it is preferable that the yaw rate reliability determination means is a collision determination means configured to determine presence or absence of a collision between the own vehicle and an obstacle outside the vehicle, and the yaw rate determination means determines the detection yaw rate as the yaw rate generated in the own vehicle at the time the collision determination means does not determine that the collision occurs, and determine the yaw rate based on the calculation yaw rate at the time the collision determination means determines that the collision occurs.

Further, in the vehicle movement state determination device, it is preferable that the collision determination means determines presence or absence of the collision based on the acceleration detected by the acceleration sensor.

Further, it is preferable that the vehicle movement state determination device further includes a collision position prediction means configured to predict a collision position on the own vehicle colliding with the obstacle; and an acceleration reliability determination means configured to determine an acceleration sensor of which reliability of the detected acceleration decreases based on the collision position predicted by the collision position prediction means. Here, the yaw rate calculation means calculates the yaw rate generated in the own vehicle as the calculation yaw rate based on the acceleration detected by the acceleration sensor which is not determined as the acceleration sensor of which the reliability of the detected acceleration decreases by the acceleration reliability determination means.

Further, in the vehicle movement state determination device, it is preferable that the acceleration sensor includes at least a fixed electrode and a variable electrode displaced in response to the acceleration applied to the own vehicle, and the vehicle movement state determination device further includes a voltage control means configured to detect an acceleration in response to a change in an electrostatic capacity of one of the fixed electrode and the variable electrode not applied with a drive voltage, at the time the drive voltage is applied to one of the fixed electrode and the variable electrode constituting the acceleration sensor, and increases a voltage value allocated in response to the electrostatic capacity of the acceleration sensor, at the time the calculation yaw rate is calculated by the yaw rate calculation means.

Further, it is preferable that the vehicle movement state determination device further includes a capacity increasing means configured to increase an information capacity allocated to the yaw rate calculation means in an electronic control unit constituting the yaw rate calculation means.

A vehicle movement control device according to the present invention includes a movement control means configured to perform a movement control of the own vehicle based on the yaw rate determined by the yaw rate determination means of the vehicle movement state determination device.

Effects of the Invention

According to the vehicle movement state determination device and the vehicle movement control device according to the invention, since the yaw rate is determined based on the yaw rate calculation value calculated based on the detection value of the acceleration sensor when the reliability of the detection value of the yaw rate sensor is low, there is an effect that degradation in the reliability of the yaw rate determination result can be suppressed.

BRIEF DESCRIPTION OF DRAWINGS

FIG. 20 is an example of a table for determining a failure sensor and a usage sensor in response to a collision position when a front collision is predicted.

FIG. 21 is an example of a table for determining a failure sensor and a usage sensor in response to a collision position when a side collision is predicted.

FIG. 24 is an example of a determination map for a switching of a yaw rate detection means by the prediction of the side collision.

FIG. 25 is another example of a determination map for a switching of a yaw rate detection means by the prediction of the side collision.

DESCRIPTION OF EMBODIMENTS

Hereinafter, an embodiment of a vehicle movement state determination device and a vehicle movement control device according to the invention will be described in detail with reference to the drawings. Furthermore, the invention is not limited to the embodiment. Further, the components of the embodiment below include a component which may be easily supposed by the person skilled in the art or a component which has substantially the same configuration.

Embodiment

Figure 2:
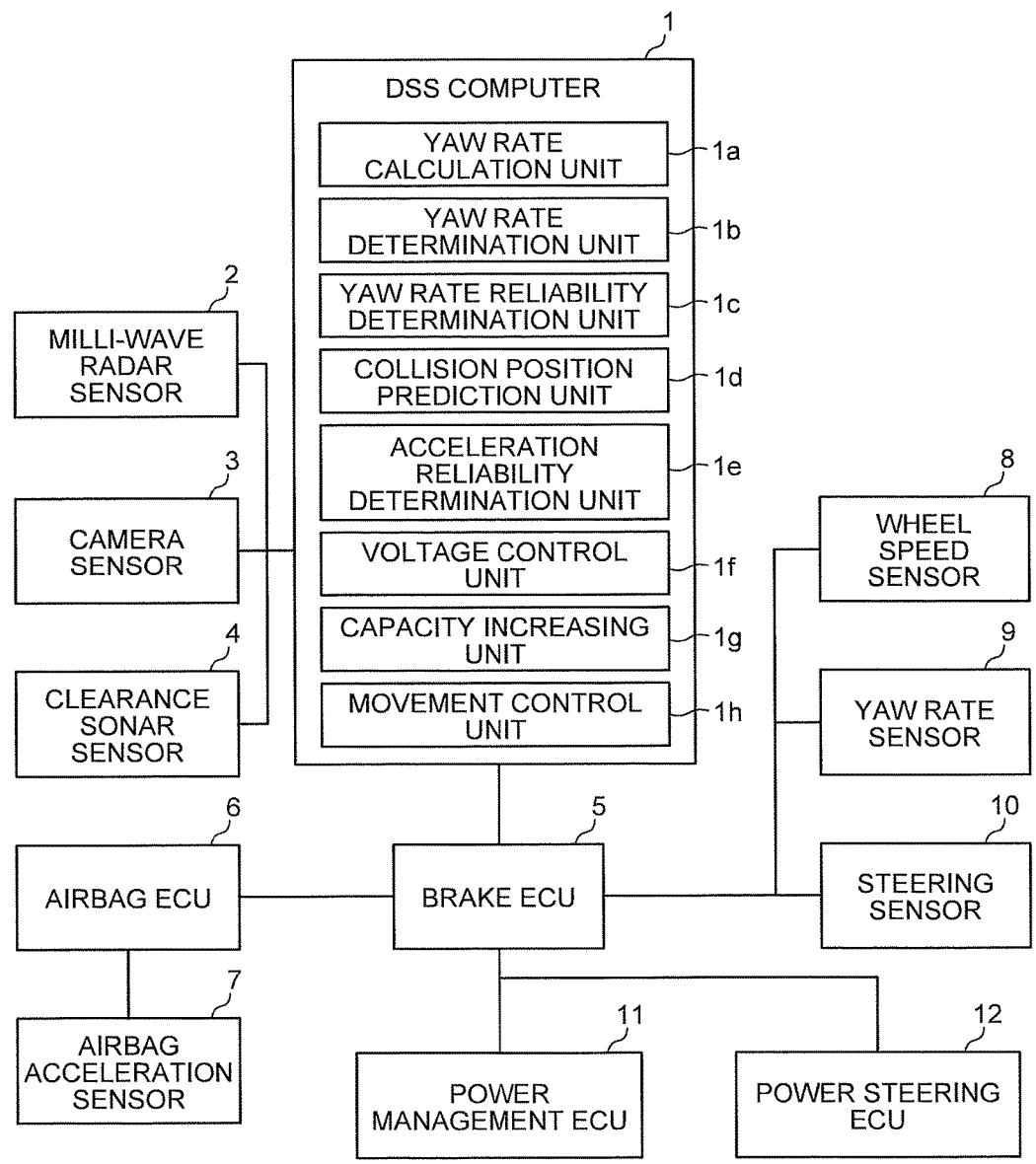
FIG. 2 is a diagram illustrating the configurations of a vehicle movement state determination device and a vehicle movement control device according to the invention.
Figure 3:
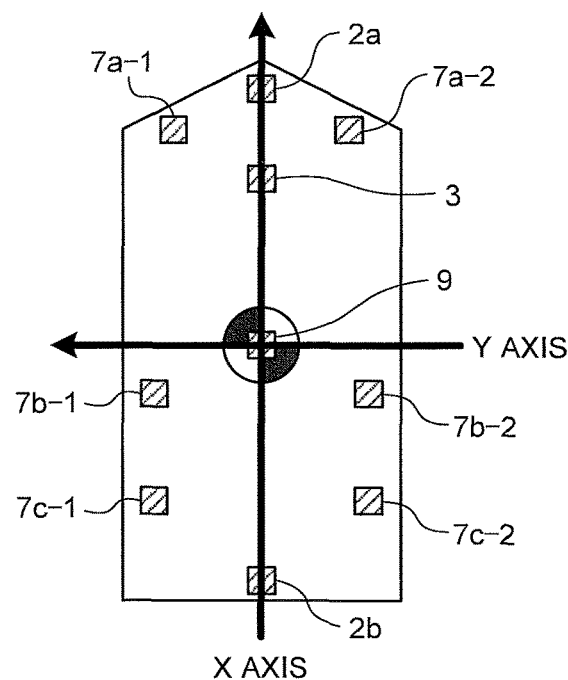
FIG. 3 is a diagram illustrating a mounting position example of various sensors mounted on a vehicle.
Figure 4:
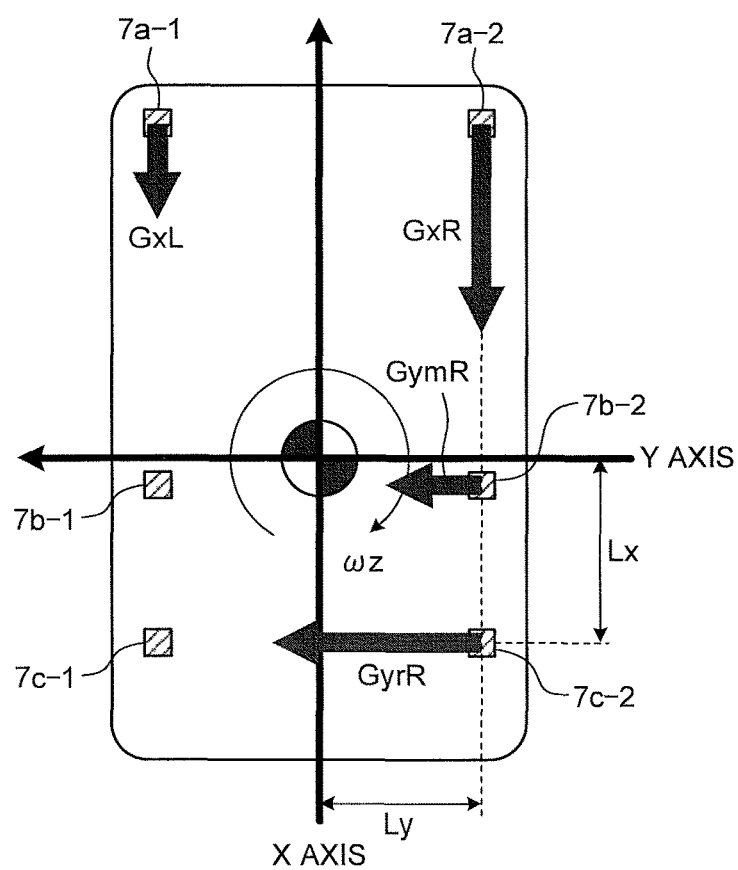
FIG. 4 is a diagram illustrating an example of an airbag acceleration sensor and acceleration in the event of a collision.
Figure 5:
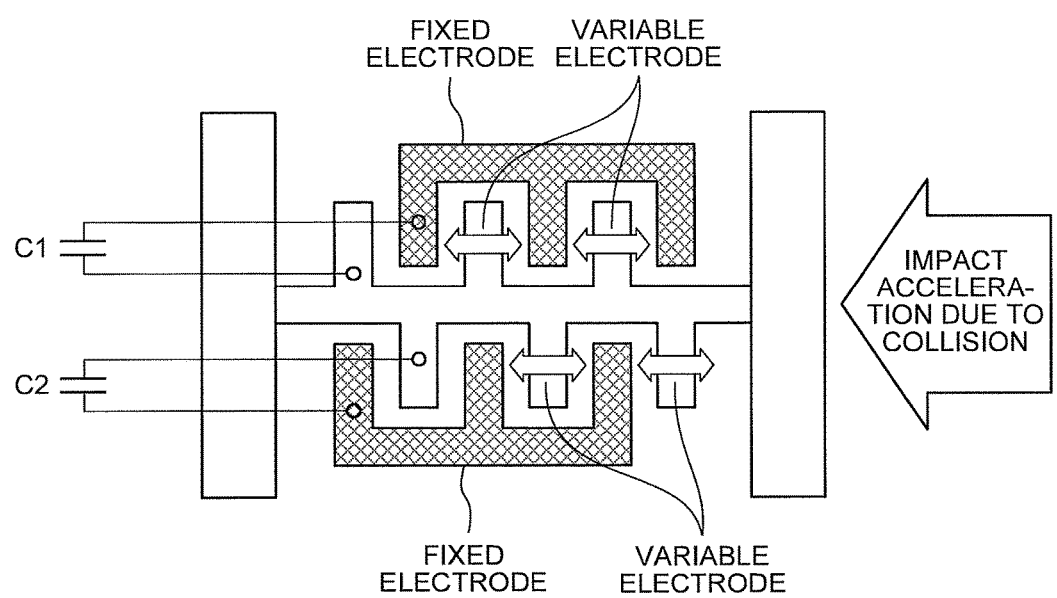
FIG. 5 is a diagram illustrating an example of the structure of the airbag acceleration sensor.

Referring to FIGS. 2 to 5, the configurations of the vehicle movement state determination device and the vehicle movement control device according to the invention will be described. FIG. 2 is a diagram illustrating the configuration of the vehicle movement state determination device and the vehicle movement control device according to the invention. FIG. 3 is a diagram illustrating a mounting position example of various sensors mounted on a vehicle. FIG. 4 is a diagram illustrating an example of an airbag acceleration sensor and acceleration in the event of a collision. FIG. 5 is a diagram illustrating an example of the structure of the airbag acceleration sensor.

The vehicle movement state determination device and the vehicle movement control device of the embodiment are mounted on a vehicle (an own vehicle), and typically includes a DSS computer 1, a milli-wave radar sensor 2, a camera sensor 3, a clearance sonar sensor 4, a brake ECU 5, an airbag ECU 6, an airbag acceleration sensor 7, a wheel speed sensor 8, a yaw rate sensor 9, a steering sensor 10, a power management ECU 11, and a power steering ECU 12 as illustrated in FIG. 2.

In FIG. 2, the DSS computer 1, the brake ECU 5, the airbag ECU 6, the power management ECU 11, and the power steering ECU 12 are used to control the drive states of the components of the vehicle, and are electronic control units each mainly including a well-known microcomputer with a CPU, a ROM, a RAM, and an interface. The DSS computer 1 is electrically connected to the milli-wave radar sensor 2, the camera sensor 3, and the clearance sonar sensor 4, and receives an electric signal corresponding to a detection result. The brake ECU 5 is electrically connected to the wheel speed sensor 8, the yaw rate sensor 9, and the steering sensor 10, and receives an electric signal corresponding to a detection result. The airbag ECU 6 is electrically connected to the airbag acceleration sensor 7, and receives an electric signal corresponding to a detection result. The DSS computer 1, the brake ECU 5, the airbag ECU 6, the power management ECU 11, and the power steering ECU 12 can transmit and receive an information such as a detection signal, a drive signal, or a control instruction therebetween.

The DSS computer 1 is an Electronic Control Unit (ECU) that realizes a Driver Support System (DSS) function by controlling the components of the vehicle. As the DSS function, the DSS computer 1 can predict a contact between a vehicle and an object around the vehicle based on, for example, a target information obtained from object detection sensors such as the milli-wave radar sensor 2, the camera sensor 3, and the clearance sonar sensor 4, and can perform an operation of generating an alarm for a driver, an operation of controlling a brake (a braking device), or an operation of controlling a PCS (Pre Crash Safety System). Further, as the DSS function, the DSS computer 1 can perform a Lane Keeping Assist (LKA) control of controlling a steerer (a steering device) so that the vehicle does not deviate from a lane based on, for example, a white line information from the object detection sensor. Further, as the DSS function, the DSS computer 1 can perform a Vehicle Stability Control (VSC) control of a vehicle stability control system of stabilizing the vehicle by suppressing a drift, which easily occurs when the vehicle travels along a curve, based on a vehicle movement state amount such as a yaw rate. Such a DSS function can be performed as a pre-collision preventive safety traveling control or a post-collision safety traveling control by the DSS computer 1. Furthermore, various process units (a yaw rate calculation unit 1a to a movement control unit 1h) provided in the DSS computer 1 will be described in detail later.

The milli-wave radar sensor 2 is a sensor which detects a distance or a direction with respect to an object by emitting a milli-wave toward an object and measuring a reflection wave thereof. The camera sensor 3 captures an object, and detects the size or the shape of the object which can be analyzed from the captured image. The clearance sonar sensor 4 is a sensor which emits a sonic wave or an ultrasonic wave toward an object and detects a clearance with respect to the object from the time until the sonic wave or the ultrasonic wave is reflected and returned. The milli-wave radar sensor 2, the camera sensor 3, and the clearance sonar sensor 4 serve as the object detection sensors.

Here, the object detection sensor is a vehicle periphery monitoring sensor, and detects a white line or a target by detecting an object around the vehicle. As the detection of the white line, the object detection sensor detects a white line provided in a traveling road along which the vehicle travels. Further, as the detection of the target, the object detection sensor detects, for example, a three-dimensional object such as a pedestrian around the vehicle, the other vehicle, a utility pole, an obstacle, a guardrail, or a wall surface. Further, the object detection sensor can detect an object around the vehicle and can detect a relative physical amount indicating a relative relation between the detected object and the vehicle. The object detection sensor detects, for example, at least one of the relative position (the coordinate system) between the vehicle and the object, the relative speed (m/s) therebetween, the relative distance (m) therebetween, and a Time-To-Collision: a contact allowance time (TTC) (s) as the relative physical amount. Here, TTC corresponds to a time until the vehicle reaches the object, and the relative distance between the vehicle and the object corresponds to a time which is changed in response to the relative speed. The object detection sensor is electrically connected to the DSS computer 1, and outputs a white line information based on the detection of the white line or a target information (including the relative physical amount and the like) based on the detection of the target to the DSS computer 1.

The brake ECU 5 is an ECU which controls a brake mounted on the vehicle. The brake ECU 5 controls the operation of the brake in accordance with, for example, an instruction from the DSS computer 1. Here, the brake is typically an electronically controlled brake, but any brake which generates a braking force in a wheel of the vehicle may be employed. For example, the brake may include a device which generates a braking force in the wheel of the vehicle by a parking brake or an engine brake. The brake ECU 5 operates the brake when the DSS computer 1 performs a PCS control or a VSC control as the DSS function.

The airbag ECU 6 is an ECU which controls an airbag installed in the vehicle. The airbag ECU 6 controls the operation of the airbag in accordance with, for example, an instruction from the DSS computer 1. Here, the airbag includes a front airbag which is installed in the vicinity of a handle of the vehicle so as to protect a front surface of an occupant and a side airbag which is installed in the vicinity of a door of the vehicle so as to protect a side surface of the occupant. Here, a collision occurrence signal which is generated in response to a detection result of the airbag acceleration sensor 7 (the acceleration sensor) serving as the collision detection sensor is input to the airbag ECU 6. In the embodiment, the airbag acceleration sensor 7 is a sensor which detects the acceleration generated in the own vehicle, and is a sensor which is different from the yaw rate sensor 9. The collision occurrence signal is a signal which is generated when the airbag acceleration sensor 7 detects the acceleration of a magnitude having a possibility of the collision between the vehicle and the obstacle outside the vehicle. The airbag ECU 6 develops the airbag by outputting a control signal to the airbag when the collision occurrence signal is input from the airbag acceleration sensor 7 thereto. The airbag ECU 6 develops the airbag, and outputs the collision occurrence signal input from the airbag acceleration sensor 7 to the DSS computer 1.

The wheel speed sensor 8 is a wheel speed detection device which is provided in each wheel so as to detect each wheel speed. Each wheel speed sensor 8 detects the wheel speed as the rotation speed of each wheel. Each wheel speed sensor 8 outputs a detection signal indicating the detected wheel speed of each wheel to the DSS computer 1. The DSS computer 1 calculates the vehicle speed as the traveling speed of the vehicle based on the wheel speed of each wheel input from each wheel speed sensor 8. The DSS computer 1 may calculate the vehicle speed based on the wheel speed input from at least one of the wheel speed sensors 8. The yaw rate sensor 9 is a yaw rate detection device which detects the yaw rate generated in the own vehicle. The yaw rate sensor 9 outputs a detection signal indicating the detected yaw rate to the DSS computer 1. The steering sensor 10 is a steering angle detection device which detects the steering angle of the steering wheel in response to the steering operation of the driver. The steering sensor 10 outputs a detection signal indicating the detected steering angle to the DSS computer 1. The DSS computer 1 can determine the swing state (the swing posture) of the vehicle based on the detection signals of the yaw rate sensor 9 and the steering sensor 10.

The power management ECU 11 is an ECU which controls a drive assembly such as an engine or a motor mounted on the vehicle. The power management ECU 11 controls the operation of the drive assembly in accordance with, for example, an instruction from the DSS computer 1. Further, the power steering ECU 12 is an ECU which controls a steering assembly such as an Electronic Power Steering (EPS) mounted on the vehicle. The power steering ECU 12 controls the operation of the steering assembly in accordance with, for example, an instruction from the DSS computer 1. The power steering ECU 12 operates the steering assembly or the drive assembly when the DSS computer 1 performs the LKA control or the VSC control as the DSS function in corporation with the brake ECU 5 or the power management ECU 11.

Returning to the description of the DSS computer 1, various process units (the yaw rate calculation unit 1$a$ to the movement control unit 1$h$) provided in the DSS computer 1 will be described in detail. The DSS computer 1 includes at least the yaw rate calculation unit 1$a$, the yaw rate determination unit 1$b$, the yaw rate reliability determination unit 1$c$, the collision position prediction unit 1$d$, the acceleration reliability determination unit 1$e$, the voltage control unit 1$f$, the capacity increasing unit 1$g$, and the movement control unit 1$h$.

The yaw rate calculation unit 1$a$ in the DSS computer 1 is a yaw rate calculation means which calculates the yaw rate generated in the own vehicle based on the acceleration detected by the airbag acceleration sensor 7.

As an example, a yaw rate calculation method which is performed by the yaw rate calculation unit 1$a$ using the airbag acceleration sensor 7 will be described with reference to FIGS. 3 and 4. In FIG. 3, the milli-wave radar sensor 2 includes a front milli-wave radar sensor 2$a$ which is mounted on the front surface of the vehicle and a rear milli-wave radar sensor 2$b$ which is mounted on the rear surface of the vehicle. The camera sensor 3 is mounted on the front side of the vehicle. The yaw rate sensor 9 is installed at the center position of the vehicle. The airbag acceleration sensor 7 includes front airbag acceleration sensors 7$a$-1 and 7$a$-2 which are mounted on the front surface of the vehicle, side airbag acceleration sensors 7$b$-1 and 7$b$-2 which are mounted on the side surface of the vehicle, and rear airbag acceleration sensors 7$c$-1 and 7$c$-2 which are mounted on the rear surface of the vehicle. Here, as illustrated in FIG. 3, when two axes perpendicular to the center of the vehicle are set as the X axis (the axis in the advancing direction) and the Y axis (the axis in the vehicle width direction), the front airbag acceleration sensors 7$a$-1 and 7$a$-2 detect the acceleration in the X direction, and the side airbag acceleration sensors 7$b$-1 and 7$b$-2 and the rear airbag acceleration sensors 7$c$-1 and 7$c$-2 detect the acceleration in the Y direction.

Since two behaviors of the translation and the rotation are supposed as the movement state of the vehicle, there is a need to provide two or more airbag acceleration sensors 7 which are distant from the center of the vehicle by different distances in order to detect the yaw rate from the airbag acceleration sensor 7. In FIG. 4, GxL indicates the acceleration generated in the event of the collision and detected by the front airbag acceleration sensor 7$a$-1 mounted on the left front surface of the vehicle. GxR indicates the acceleration generated in the event of the collision and detected by the front airbag acceleration sensor 7$a$-2 mounted on the right front surface of the vehicle. GymR indicates the acceleration generated in the event of the collision and detected by the side airbag acceleration sensor 7b-2 mounted on the right side surface of the vehicle. GyrR indicates the acceleration generated in the event of the collision and detected by the rear airbag acceleration sensor 7c-2 mounted on the right rear surface of the vehicle. Lx indicates the shortest distance from the mounting position of the rear airbag acceleration sensor 7c-2 to the Y axis. Ly indicates the shortest distance from the mounting position of the side airbag acceleration sensor 7b-2 or the rear airbag acceleration sensor 7c-2 to the X axis. ωz indicates the magnitude of the yaw rate.

For example, when it is assumed that a collision occurs in the right front portion of the own vehicle, the yaw rate calculation unit 1a calculates the yaw rate ω according to the following equation 1 due to the constant value of the equation of Ly=const.

$$Ly^* d\omega/dt = GxR - GxL$$

$$\Leftrightarrow \omega = \int ((GxR - GxL)/Ly) dt \quad \text{(equation 1)}$$

Further, for example, when it is assumed that a collision occurs in the right rear side portion of the own vehicle, the yaw rate calculation unit 1a calculates the yaw rate ω according to the following equation 2 due to the constant value of the equation of Lx=const.

$$Lx^* d\omega/dt = GyrR - GymR$$

$$\Leftrightarrow \omega = \int ((GyrR - GymR)/Lx) dt \quad \text{(equation 2)}$$

Returning to FIG. 2, the yaw rate determination unit 1b in the DSS computer 1 is a yaw rate determination means which determines the yaw rate generated in the own vehicle based on at least one of the detection yaw rate (detection value of the yaw rate) detected by the yaw rate sensor 9 and the calculation yaw rate (calculation value of the yaw rate) calculated by the yaw rate calculation unit 1a. In the embodiment, when the yaw rate reliability determination unit 1c does not determine that the reliability of the detection yaw rate is low, the yaw rate determination unit 1b determines the detection yaw rate detected by the yaw rate sensor 9 as the yaw rate generated in the own vehicle. Meanwhile, when the yaw rate reliability determination unit 1c determines that the reliability of the detection yaw rate is low, the yaw rate is determined based on the calculation yaw rate calculated by the yaw rate calculation unit 1a. Accordingly, according to the embodiment, it is possible to suppress degradation in the reliability of the yaw rate determination result when the reliability of the detection value of the yaw rate sensor is low.

The yaw rate reliability determination unit 1c is a yaw rate reliability determination means which determines whether the reliability of the detection yaw rate detected by the yaw rate sensor 9 is low. In the embodiment, the yaw rate reliability determination unit 1c is also a collision determination means which determines presence or absence of a collision between the own vehicle and the obstacle outside the vehicle. In this case, when the collision determination means does not determine that the collision between the own vehicle and the obstacle outside the vehicle occurs, the yaw rate determination unit 1b determines the detection yaw rate detected by the yaw rate sensor 9 as the yaw rate generated in the own vehicle. Meanwhile, when the collision determination means determines that the collision between the own vehicle and the obstacle outside the vehicle occurs, the yaw rate determination unit determines the yaw rate based on the calculation yaw rate calculated by the yaw rate calculation unit 1a. Accordingly, according to the embodiment, it is possible to suppress the yaw rate determination result from being decreased due to the collision. Here, the collision determination means determines presence or absence of the collision based on the acceleration detected by the airbag acceleration sensor 7. Accordingly, according to the embodiment, since the collision detection acceleration sensor is used, the yaw rate may be determined by detecting the acceleration within the detectable range of the sensor even in the event of the collision.

Further, in the embodiment, the yaw rate reliability determination unit 1c may be a vehicle abnormality determination means which determines presence or absence of the vehicle abnormality in the own vehicle. In this case, when the vehicle abnormality determination means does not determine that the vehicle abnormality of the own vehicle occurs, the yaw rate determination unit 1b determines the detection yaw rate detected by the yaw rate sensor 9 as the yaw rate generated in the own vehicle. Meanwhile, when the vehicle abnormality determination means determines that the vehicle abnormality of the own vehicle occurs, the yaw rate determination unit determines the yaw rate based on the calculation yaw rate calculated by the yaw rate calculation unit 1a. Accordingly, according to the embodiment, it is possible to suppress a problem in which the yaw rate determination result decreases due to the vehicle abnormality such as the bursting of the tire in the traveling state. For example, the bursting of the tire may be detected by a pneumatic sensor of the tire of the target.

The collision position prediction unit 1d is a collision position prediction means which predicts a collision position on the own vehicle colliding with the obstacle outside the vehicle. Further, the acceleration reliability determination unit 1e is an acceleration reliability determination means which determines the airbag acceleration sensor 7 of which the reliability of the detected acceleration decreases based on the collision position predicted by the collision position prediction unit 1d. In this case, the yaw rate calculation unit 1a calculates the yaw rate generated in the own vehicle as the calculation yaw rate based on the acceleration detected by the airbag acceleration sensor 7 which is not determined as the acceleration sensor of which the reliability of the detected acceleration decreases by the acceleration reliability determination unit 1e. Accordingly, according to the embodiment, since the detection result of the acceleration sensor having low reliability is not used, the reliability of the yaw rate determination result can be further improved.

Here, the acceleration detection principle of the airbag acceleration sensor 7 will be described with reference to FIG. 5. FIG. 5 illustrates the structure of the comb-shaped airbag acceleration sensor 7 including a fixed electrode and a variable electrode which is displaced in response to the acceleration applied to the own vehicle. As illustrated in FIG. 5, the airbag acceleration sensor 7 which moves in a manner such that the comb-shaped portion receives the impact acceleration caused by the impact as the acceleration, and detects the acceleration G as a change in electrostatic capacity C according to the following equation 3. As illustrated in FIG. 5, the electrostatic capacity C1 indicates the electrostatic capacity caused by the fixed electrode and the variable electrode at one side as the upper side of the drawing, and the electrostatic capacity C2 indicates the electrostatic capacity caused by the fixed electrode and the variable electrode as the other side as the lower side of the drawing.

$$\text{Acceleration } G \approx \frac{C1 - C2}{C1 + C2} \quad \text{(equation 3)}$$

Returning to FIG. 2, the voltage control unit 1f in the DSS computer 1 detects the acceleration in response to a change in the other electrostatic capacity when a drive voltage is applied to any one of the fixed electrode and the variable electrode displaced in response to the acceleration applied to the own vehicle and constituting the airbag acceleration sensor 7 as illustrated in FIG. 5, and is a voltage control means which increases the voltage value allocated in response to the electrostatic capacity of the airbag acceleration sensor 7 when the calculation yaw rate is calculated by the yaw rate calculation unit 1a. Accordingly, according to the embodiment, since a voltage allocated to the unit acceleration increases, the resolution of the airbag acceleration sensor 7 increases, and hence the yaw rate can be determined with high reliability. Further, the capacity increasing unit 1g is a capacity increasing means which increases the information capacity allocated to the yaw rate calculation unit 1a in the electronic control unit constituting the yaw rate calculation unit 1a. Accordingly, according to the embodiment, even when the number of the information to be processed by the electronic control unit constituting the yaw rate calculation unit 1a increases, the information capacity to be allocated in response to the situation increases so that the ECU process performance increases, and hence an appropriate process may be performed.

The movement control unit 1h is a movement control means which performs a movement control of the own vehicle based on the yaw rate determined by the yaw rate determination unit 1b. Accordingly, according to the embodiment, the movement control may be performed based on the yaw rate with high reliability.

Various processes which are performed by the vehicle movement state determination device and the vehicle movement control device with the above-described configuration will be described with reference to FIGS. 6 to 31. In the embodiment, various processes illustrated in the flowchart are repeated every predetermined time.

Figure 6:
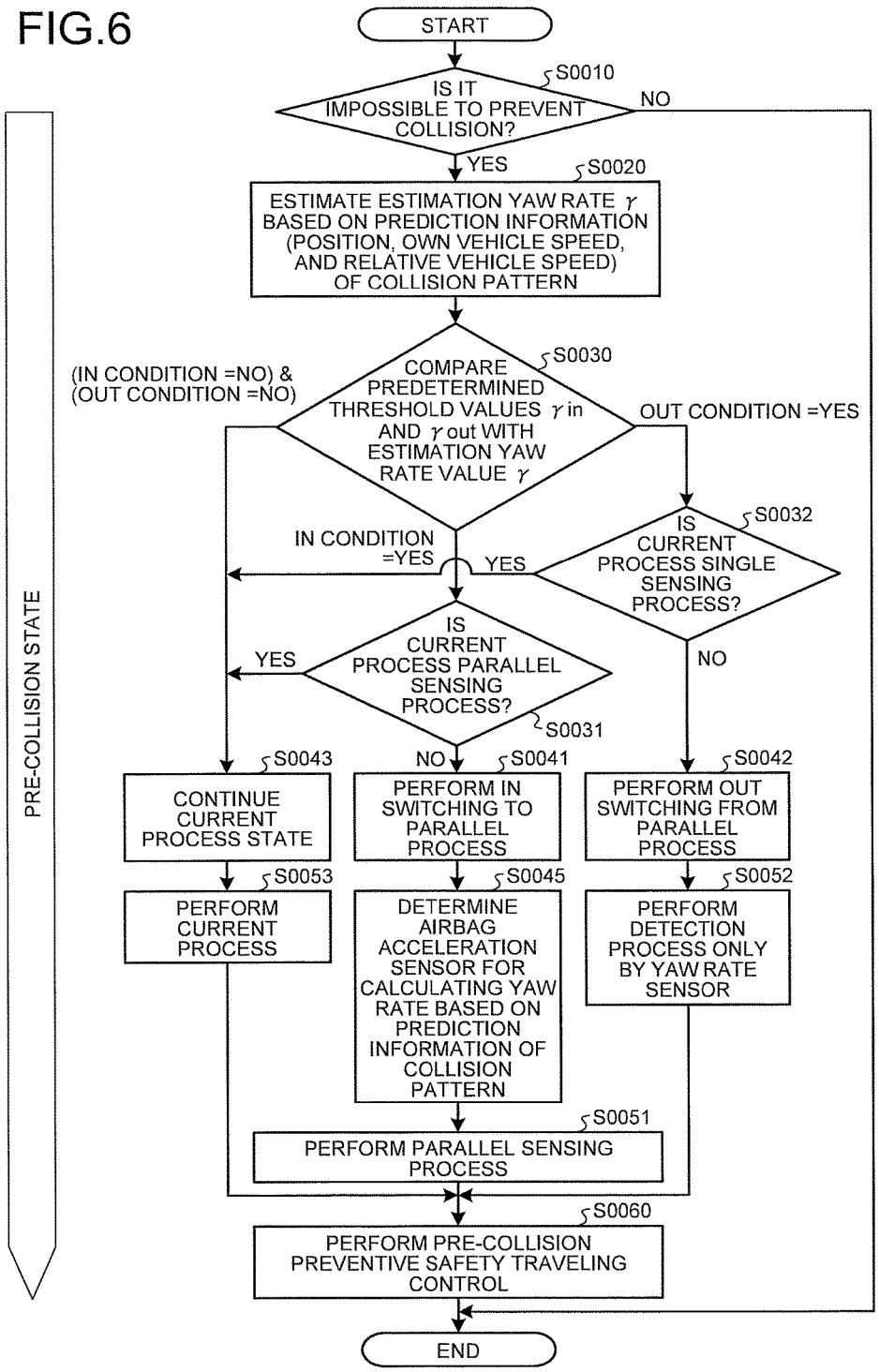
FIG. 6 is a flowchart illustrating an example of a basic process of the vehicle movement state determination device and the vehicle movement control device according to the invention.

A basic process which is performed by the vehicle movement state determination device and the vehicle movement control device before the collision occurs will be described with reference to FIGS. 6 to 15. FIG. 6 is a flowchart illustrating an example of the basic process which is performed by the vehicle movement state determination device and the vehicle movement state determination device according to the invention before the collision occurs.

As illustrated in FIG. 6, the DSS computer 1 performs the process of step S0010 to step S0060 below as the process before the collision occurs. First, the DSS computer 1 determines whether the collision between the vehicle and the obstacle outside the vehicle can be prevented based on the information obtained from the object detection sensors such as the milli-wave radar sensor 2, the camera sensor 3, and the clearance sonar sensor 4 (step S0010). For example, the DSS computer 1 determines whether the collision between the vehicle and the obstacle outside the vehicle can be prevented based on the information such as the relative position (the coordinate system) between the vehicle and the object input from the object detection sensor, the relative speed (m/s) thereof, the relative distance (m) thereof, and the TTC (s) thereof.

In step S0010, when the DSS computer 1 determines that the non-collision prevention state is not established, that is, the collision can be prevented (step S0010: No), the present control is terminated. Meanwhile, when the DSS computer 1 determines that the collision cannot be prevented (step S0010: Yes), the process proceeds to step S0020.

The DSS computer 1 estimates the estimation yaw rate γ in the event of the collision used in the determination process performed in next step S0030 based on the prediction information (the position, the own vehicle speed, the relative vehicle speed, or the like) of the collision pattern obtained by the object detection sensor (step S0020). In step S0020, the DSS computer 1 estimates the estimation yaw rate γ in the event of the collision based on the prediction result of the collision position on the own vehicle colliding with the obstacle obtained by the collision position prediction unit 1d. Subsequently, the process proceeds to step S0030.

Figure 7:
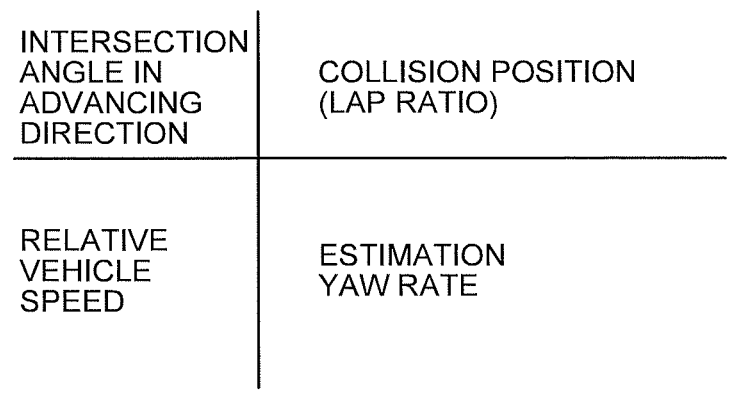
FIG. 7 is an example of a map of an estimation yaw rate value with respect to a collision in the X direction.

Here, a method of estimating the estimation yaw rate γ in the event of the collision performed in step S0020 will be described with reference to FIG. 7. FIG. 7 is an example of a map for the estimation yaw rate value in the X direction (the advancing direction). In the map of FIG. 7, the relative vehicle speed is set in the vertical axis, and the collision position (the lap ratio) is set in the horizontal axis. The lap ratio mentioned herein is an index indicating the range of the collision portion of the own vehicle when the own vehicle collides with the relative vehicle (see FIGS. 9 and 10). In the case of the collision in the X direction, the own vehicle collides with the relative vehicle at the front surface portion. Thus, the lap ratio becomes 100% when the collision occurs in the entire area (the area corresponding to the vehicle width) of the front surface portion of the own vehicle. When the collision occurs in a partial area of the front surface portion, the lap ratio changes in response to the degree in which the partial area occupies the entire area of the front surface portion. In this case, the lap ratio becomes 70%, for example, when the collision occurs in a partial area corresponding to about 70% of the entire area of the front surface portion of the own vehicle. Further, the lap ratio becomes 40% when the collision occurs in a partial area corresponding to about 40% of the entire area of the front surface portion. Furthermore, the lap ratio becomes 25% when the collision occurs in a partial area corresponding to about 25% of the entire area of the front surface portion.

In the estimation yaw rate illustrated in the map of FIG. 7, a predetermined value is set in advance in response to the relative vehicle speed in the vertical axis and the collision position (the lap ratio) in the horizontal axis. As the value of the estimation yaw rate, a value is set in advance by performing a simulation or a collision test on various combinations of the relative vehicle speed and the collision position (the lap ratio). Regarding the collision in the X direction, the DSS computer 1 determines the estimation yaw rate corresponding to a combination which is set such that the relative vehicle speed is set as the input value in the vertical axis of the map of FIG. 7 and the collision position (the lap ratio) is set as the input value in the horizontal axis of the map of FIG. 7 based on the prediction information (the position, the own vehicle speed, the relative vehicle speed, or the like) of the collision pattern obtained by the object detection sensor.

Further, the map of FIG. 7 is switched in response to the intersection angle in the advancing direction. When the axis in the advancing direction of the own vehicle is set as the reference line, the intersection angle in the advancing direction mentioned herein indicates an angle which is formed between the reference line and the axis in the advancing direction of the relative vehicle colliding with the own vehicle. Regarding the collision in the X direction, the DSS computer 1 estimates the intersection angle in the advancing direction based on the prediction information (the position, the own vehicle speed, the relative vehicle speed, or the like) of the collision pattern obtained by the object detection sensor, and switches the map for the estimation yaw rate value with respect to the collision in the X direction determined from the collision position (the lap ratio) and the relative vehicle speed in response to the intersection angle in the advancing direction. Then, the DSS computer 1 sets the relative vehicle speed as the input value in the vertical axis and sets the collision position (the lap ratio) as the input value in the horizontal axis in the switched map. Subsequently, the DSS computer sets the estimation yaw rate value correlated to the combination as the estimation yaw rate γ with respect to the collision in the X direction.

Figure 8:
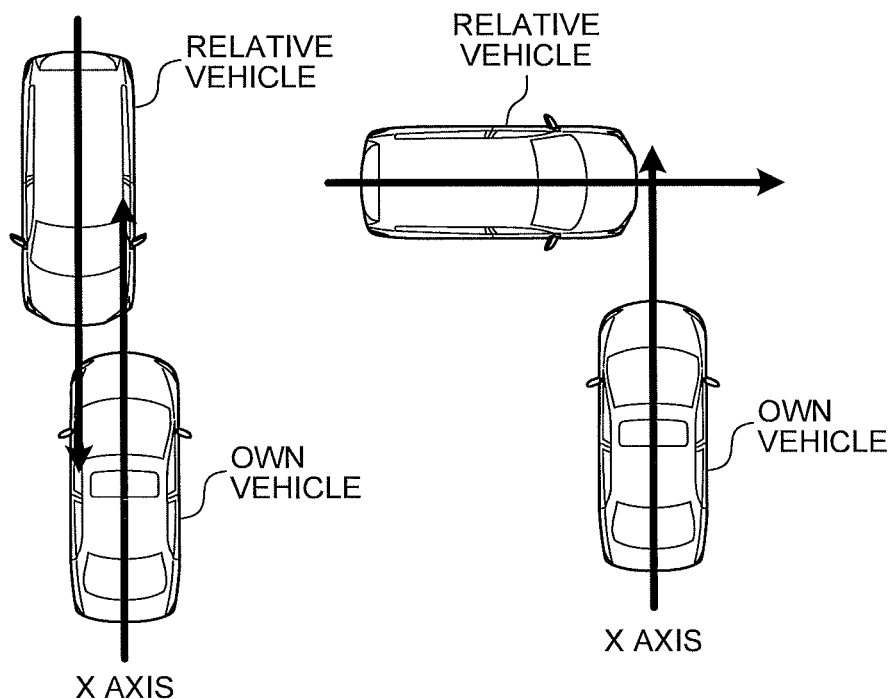
FIG. 8 is a diagram illustrating a collision case of an own vehicle in the X direction.
Figures 9, 10:
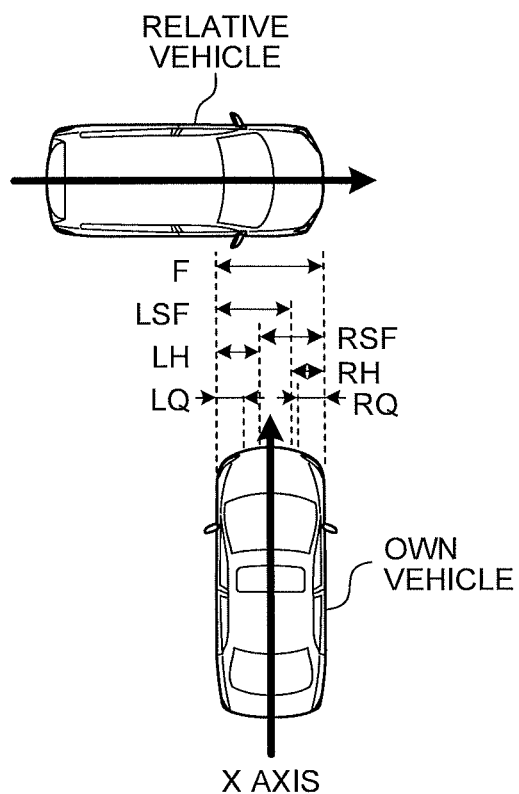
FIG. 9 is a diagram illustrating an example of a collision position classification in the X direction.
FIG. 10 is a diagram illustrating an abbreviation indicating the collision position in the X direction.

Further, a method of estimating the estimation yaw rate γ in the event of the collision in a state where the vehicles are aligned to the X and Y axes will be described with reference to FIGS. 8 to 14. First, a yaw rate estimation process in the event of the collision using the collision pattern prediction information and performed on the collision (the head-on collision or the rear-end collision) in the X direction will be described with reference to FIGS. 8 to 11. FIG. 8 is a diagram illustrating the collision case of the own vehicle in the X direction. FIG. 9 is a diagram illustrating an example of the collision position classification in the X direction. FIG. 10 is a diagram illustrating an abbreviation illustrating the collision position in the X direction.

As illustrated in FIG. 8, the collision in the X direction is also assumed as the case where the own vehicle collides with the side surface of the relative vehicle other than the case where the own vehicle collides with the front surface of the relative vehicle. Here, in the case of the collision of the own vehicle with respect to the side surface of the relative vehicle, it is assumed that the relative speed in the X direction includes only the vehicle speed element of the own vehicle. In FIG. 8, it is assumed that the intersection angle in the advancing direction is 0° or 180°. When it is predicted that such a collision in the X direction occurs, the DSS computer 1 switches the map for the estimation yaw rate value with respect to the collision in the X direction illustrated in FIG. 7 in response to the intersection angle in the advancing direction. Then, the DSS computer 1 estimates the estimation yaw rate γ in the X direction as the estimation yaw rate value corresponding to a combination which is set such that the relative vehicle speed is set as the input value in the vertical axis and the collision position (the lap ratio) is set as the input value in the horizontal axis in the switched map.

Here, the collision position (the lap ratio) are classified into, for example, LQ (left: 25%), LH (left: 40%), LSF (left: 70%), F (100%), RSF (right: 70%), RH (right: 40%), and RQ (right: 25%) as illustrated in FIG. 9. The meaning of the abbreviation illustrating the collision position used in FIG. 9 will be described with reference to FIG. 10. As illustrated in FIG. 10, LQ is an abbreviation which illustrates a state where the own vehicle collides with the relative vehicle in a portion corresponding to 25% from the left end of the front surface of the vehicle when the vehicle width of the own vehicle is set as 100%. LH is an abbreviation which illustrates a state where the own vehicle collides with the relative vehicle at a portion corresponding to 40% from the left end of the front surface of the vehicle when the vehicle width of the own vehicle is set as 100%. LSF is an abbreviation which illustrates a state where the own vehicle collides with the relative vehicle at a portion corresponding to 70% from the left end of the front surface of the vehicle when the vehicle width of the own vehicle is set as 100%. F is an abbreviation which illustrates a state where the own vehicle collides with the relative vehicle at the entire front surface of the vehicle when the vehicle width of the own vehicle is set as 100%. RSF is an abbreviation which illustrates a state where the own vehicle collides with the relative vehicle at a portion corresponding to 70% from the right end of the front surface of the vehicle when the vehicle width of the own vehicle is set as 100%. RH is an abbreviation which illustrates a state where the own vehicle collides with the relative vehicle at a portion corresponding to 40% from the right end of the front surface of the vehicle when the vehicle width of the own vehicle is set as 100%. RQ is an abbreviation which illustrates a state where the own vehicle collides with the relative vehicle at a portion corresponding to 25% from the right end of the front surface of the vehicle when the vehicle width of the own vehicle is set as 100%.

Figures 11, 12, 13:
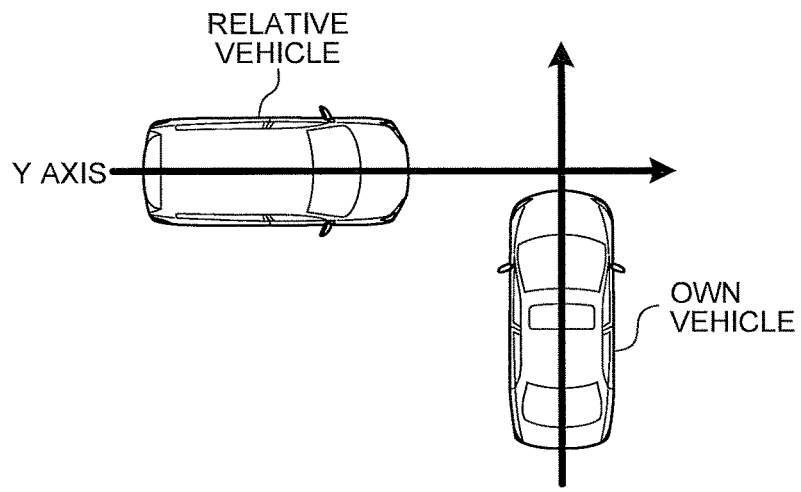
FIG. 11 is a diagram illustrating a collision case of an own vehicle in the Y direction.
FIG. 12 is an example of a map of an estimation yaw rate value with respect to a collision in the Y direction.
FIG. 13 is a diagram illustrating an example of a collision position classification in the Y direction.
Figure 14:
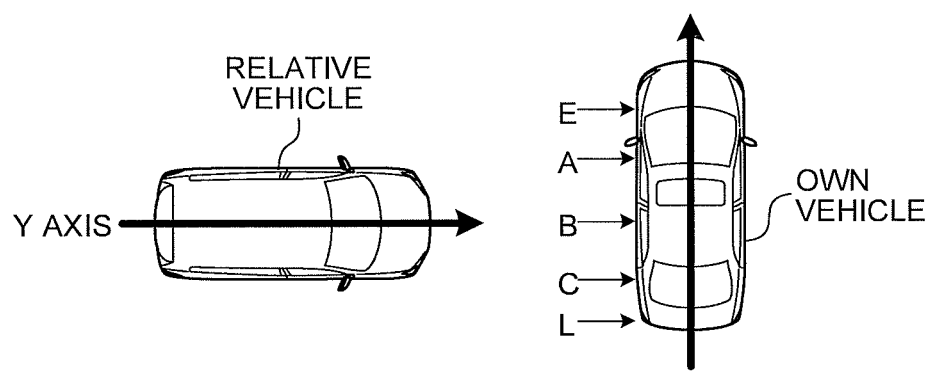
FIG. 14 is a diagram illustrating an abbreviation indicating a collision position in the Y direction.

Next, a yaw rate estimation process which is performed based on the collision pattern prediction information in the event of the collision (the side collision) in the Y direction (the vehicle width direction) will be described with reference to FIGS. 11 to 14. FIG. 11 is a diagram illustrating the collision case of the own vehicle in the Y direction. FIG. 12 is an example of the map for the estimation yaw rate value with respect to the collision in the Y direction. FIG. 13 is a diagram illustrating an example of the collision position classification in the Y direction. FIG. 14 is a diagram illustrating an abbreviation which illustrates the collision position in the Y direction.

As illustrated in FIG. 11, the collision in the Y direction occurs on the assumption that the relative vehicle collides with the side surface of the own vehicle. In FIG. 11, the intersection angle in the advancing direction is assumed as 90°. When it is predicted that such a collision in the Y direction occurs, the DSS computer 1 estimates the estimation yaw rate γ in the Y direction by using the map for the estimation yaw rate value with respect to the collision in the Y direction illustrated in FIG. 12. In the map of FIG. 12, the relative vehicle speed is set as the vehicle speed of the relative vehicle in the vertical axis, and the own vehicle speed is set in the horizontal axis. In the estimation yaw rate illustrated in the map of FIG. 12, a predetermined value is set in advance in response to the relative vehicle speed in the vertical axis and the own vehicle speed in the horizontal axis. As the value of the estimation yaw rate, a value is set in advance by performing a simulation or a collision test on various combinations of the relative vehicle speed and the own vehicle speed. Regarding the collision in the Y direction, the DSS computer 1 determines the estimation yaw rate corresponding to a combination which is set such that the relative vehicle speed is set as the input value in the vertical axis of the map of FIG. 12 and the own vehicle speed is set as the input value in the horizontal axis of the map of FIG. 12 based on the prediction information (the position, the own vehicle speed, the relative vehicle speed, or the like) of the collision pattern obtained by the object detection sensor.

Further, the map of FIG. 12 is switched in response to the collision position. In the case of the collision in the Y direction, the own vehicle collides with the relative vehicle at the side surface portion thereof. Thus, the collision position may be classified into, for example, E (engine compartment), A (A-pillar), B (B-pillar), C (C-pillar), and L (luggage) as illustrated in FIG. 13. The meaning of the abbreviation showing the collision position used in FIG. 13 will be described with reference to FIG. 14. As illustrated in FIG. 14, E is an abbreviation which illustrates a state where the own vehicle collides with the relative vehicle at a portion corresponding to the engine compartment of the side surface of the own vehicle. A is an abbreviation which illustrates a state where the own vehicle collides with the relative vehicle at a portion corresponding to the A-pillar (a pillar existing before the tilting position of the front seat) of the side surface of the own vehicle. B is an abbreviation which illustrates a state where the own vehicle collides with the relative vehicle at a portion corresponding to the B-pillar (a pillar existing between the front seat and the rear seat) of the side surface of the own vehicle. C is an abbreviation which illustrates a state where the own vehicle collides with the relative vehicle at a portion corresponding to the C-pillar (a pillar existing behind the tilting position of the rear seat) of the side surface of the own vehicle. L is an abbreviation which illustrates a state where the own vehicle collides with the relative vehicle at a portion corresponding to the luggage space of the side surface of the own vehicle.

Regarding the collision in the Y direction, the DSS computer 1 estimates the collision position based on the prediction information (the position, the own vehicle speed, the relative vehicle speed, or the like) of the collision pattern obtained by the object detection sensor, and switches the map for the estimation yaw rate value with respect to the collision in the Y direction determined from the own vehicle speed and the relative vehicle speed in response to the collision position. Then, the DSS computer 1 sets the relative vehicle speed as the input value in the vertical axis and sets the own vehicle speed as the input value in the horizontal axis in the switched map. Subsequently, the DSS computer 1 sets the estimation yaw rate value correlated to the combination as the estimation yaw rate γ with respect to the collision in the Y direction.

Returning to FIG. 6, the DSS computer 1 compares predetermined threshold values γin and γout with the estimation yaw rate value γ estimated in step S0020 (step S0030). In step S0030, the DSS computer 1 determines whether the parallel sensing process needs to be selected by comparing a transition (IN switching) determination threshold value and a deviation (OUT switching) determination threshold value of the parallel sensing process performed in step S0051 with the estimation yaw rate value γ.

In the embodiment, the parallel sensing process is a process which simultaneously performs the yaw rate detection process using the vehicle movement control yaw rate sensor 9 and the yaw rate calculation process using the yaw rate calculation unit 1a based on the acceleration detected by the collision detection airbag acceleration sensor 7. The parallel sensing process is performed by the yaw rate determination unit 1b of the DSS computer 1.

Figure 15A:
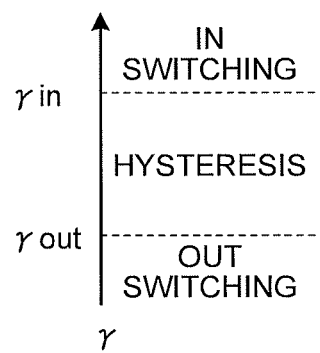
FIG. 15A is diagram illustrating an example of a yaw rate threshold value for switching determination of a parallel sensing process.
Figure 15B:
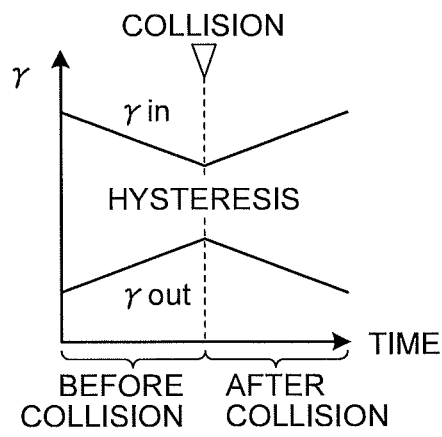
FIG. 15B is diagram illustrating an example of a yaw rate threshold value for switching determination of a parallel sensing process.

Here, the yaw rate threshold value for the switching determination of the parallel sensing process will be described with reference to FIGS. 15A and 15B. FIG. 15A illustrates an example of the hysteresis for the yaw rate threshold value γin/out used to determine the IN switching/OUT switching to the parallel sensing process in S0030. FIG. 15B illustrates an example of the temporal transition for the yaw rate threshold value γin/out. In FIGS. 15A and 15B, γin illustrates the yaw rate threshold value as the transition (IN switching) condition to the parallel sensing process. In other words, γin is the yaw rate threshold value used to determine the IN switching to the parallel sensing process. Further, γout indicates the yaw rate threshold value as the deviation (OUT switching) condition from the parallel sensing process. In other words, γout is the yaw rate threshold value used to determine the OUT switching from the parallel sensing process. As illustrated in FIGS. 15A and 15B, in the embodiment, hunting is prevented by providing a hysteresis (for example, ±80) between γin and γout.

Further, a design guide for the yaw rate threshold value for switching determination of the parallel sensing process of the embodiment will be described. As illustrated in FIG. 15B, γin is set so that the threshold value decreases as the TTC to the primary collision decreases since the necessity of the parallel sensing process in the event of the collision increases as the possibility of the primary collision increases before the collision occurs. Further, γout is also set so that the threshold value increases as the TTC to the primary collision decreases due to the same reason. Meanwhile, γin is set so that the threshold value increases as the time elapses from the primary collision since the necessity of the parallel sensing process decreases as the time elapses from the collision. Further, γout is also set so that the threshold value decreases as the time elapses from the primary collision due to the same reason. However, when the DSS computer 1 determines that the possibility of the occurrence of the secondary collision is high due to the peripheral traffic environment, the threshold values are set so that γin decreases and γout increases as the TTC to the secondary collision decreases similarly to the case where the collision occurs even after the primary collision.

Returning to FIG. 6, in step S0030, when the DSS computer 1 determines that the transition (IN switching) condition to the parallel sensing process is satisfied as the comparison result of the predetermined threshold values γin and γout with respect to the estimation yaw rate value γ estimated in step S0020 (step S0030: IN condition=Yes), the process proceeds to step S0031 as the next process, and hence it is determined whether the current sensing process state is a state where the parallel sensing process is performed by the yaw rate sensor 9 and the airbag acceleration sensor 7 (step S0031).

In step S0031, when the DSS computer 1 determines that the current sensing process state is a state where the parallel sensing process is performed (step S0031: Yes), the process proceeds to step S0043 as the next process. Meanwhile, when the DSS computer 1 determines that the current sensing process state is not a state where the parallel sensing process is performed (step S0031: No), the process proceeds to step S0041 as the next process, and hence the transition (IN switching) process is performed. Specifically, the DSS computer 1 enables an execution flag of the IN switching process to the parallel sensing process (step S0041). Then, the DSS computer 1 determines the airbag acceleration sensor 7 for calculating the yaw rate based on the collision pattern prediction information (step S0045). In step S0045, the acceleration reliability determination unit 1e of the DSS computer 1 determines the airbag acceleration sensor 7 of which the reliability of the detected acceleration decreases based on the collision position or the like predicted by the collision position prediction unit 1d in step S0020.

Then, the DSS computer 1 performs the parallel sensing process by using the airbag acceleration sensor 7 determined in step S0045, and determines the yaw rate used in the pre-collision preventive safety traveling control performed in next step S0060 (step S0051). In step S0051, the yaw rate determination unit 1b of the DSS computer 1 determines the yaw rate generated in the own vehicle based on the detection yaw rate detected by the yaw rate sensor 9 detecting the yaw rate generated in the own vehicle and the calculation yaw rate calculated by the yaw rate calculation unit 1a calculating the yaw rate generated in the own vehicle based on the acceleration detected by the airbag acceleration sensor 7. Here, in the parallel sensing process performed in step S0051, the yaw rate calculation unit 1a of the DSS computer 1 calculates the yaw rate generated in the own vehicle as the calculation yaw rate based on the acceleration detected by the airbag acceleration sensor 7 that is not determined as the airbag acceleration sensor 7 of which the reliability of the detected acceleration decreases by the acceleration reliability determination unit 1e in step S0045. Subsequently, the process proceeds to step S0060.

Further, in step S0030, when the DSS computer 1 determines that the deviation (OUT switching) condition from the parallel sensing process is satisfied from the comparison result of the predetermined threshold values γin and γout with respect to the estimation yaw rate value γ estimated in step S0020 (step S0030: OUT condition=Yes), The process proceeds to step S0032 as the next process, and it is determined whether the current sensing process state is a state where the single sensing process is performed only by the yaw rate sensor 9 (step S0032).

In step S0032, when the DSS computer 1 determines that the current sensing process state is a state where the single sensing process is performed (step S0032: Yes), the process proceeds to step S0043 as the next process. Meanwhile, when the DSS computer 1 determines that the current sensing process state is a state where the single sensing process is not performed (step S0032: No), the process proceeds to step S0042 as the next process, and hence the deviation (OUT switching) process is performed. Specifically, the DSS computer 1 enables an execution flag of the OUT switching process from the parallel sensing process (step S0042). Then, the DSS computer 1 determines the yaw rate used in the pre-collision preventive safety traveling control performed in next step S0060 by performing the yaw rate detection process (the single sensing process) only by the yaw rate sensor 9 (step S0052). Subsequently, the process proceeds to step S0060.

Further, in step S0030, when the DSS computer 1 determines that the transition (IN switching) condition to the parallel sensing process is not satisfied and the deviation (OUT switching) condition from the parallel sensing process is not also satisfied as the comparison result of the predetermined threshold values γin and γout with respect to the estimation yaw rate value γ estimated in step S0020 (step S0030: (IN condition=No) & (OUT condition=No)), the process proceeds to step S0043 as the next process, and hence the current state continuation process is performed. Specifically, the DSS computer 1 enables a current state continuation flag for continuing the current sensing process state (for example, a state where any one of the parallel sensing process using the yaw rate sensor 9 and the airbag acceleration sensor 7 and the single sensing process only using the yaw rate sensor 9 is performed) (step S0043). Then, the DSS computer 1 determines the yaw rate used in the pre-collision preventive safety traveling control performed in next step S0060 by continuing the current state continuation process (for example, the parallel sensing process or the single sensing process) (step S0053). Subsequently, the process proceeds to step S0060.

Figure 17:
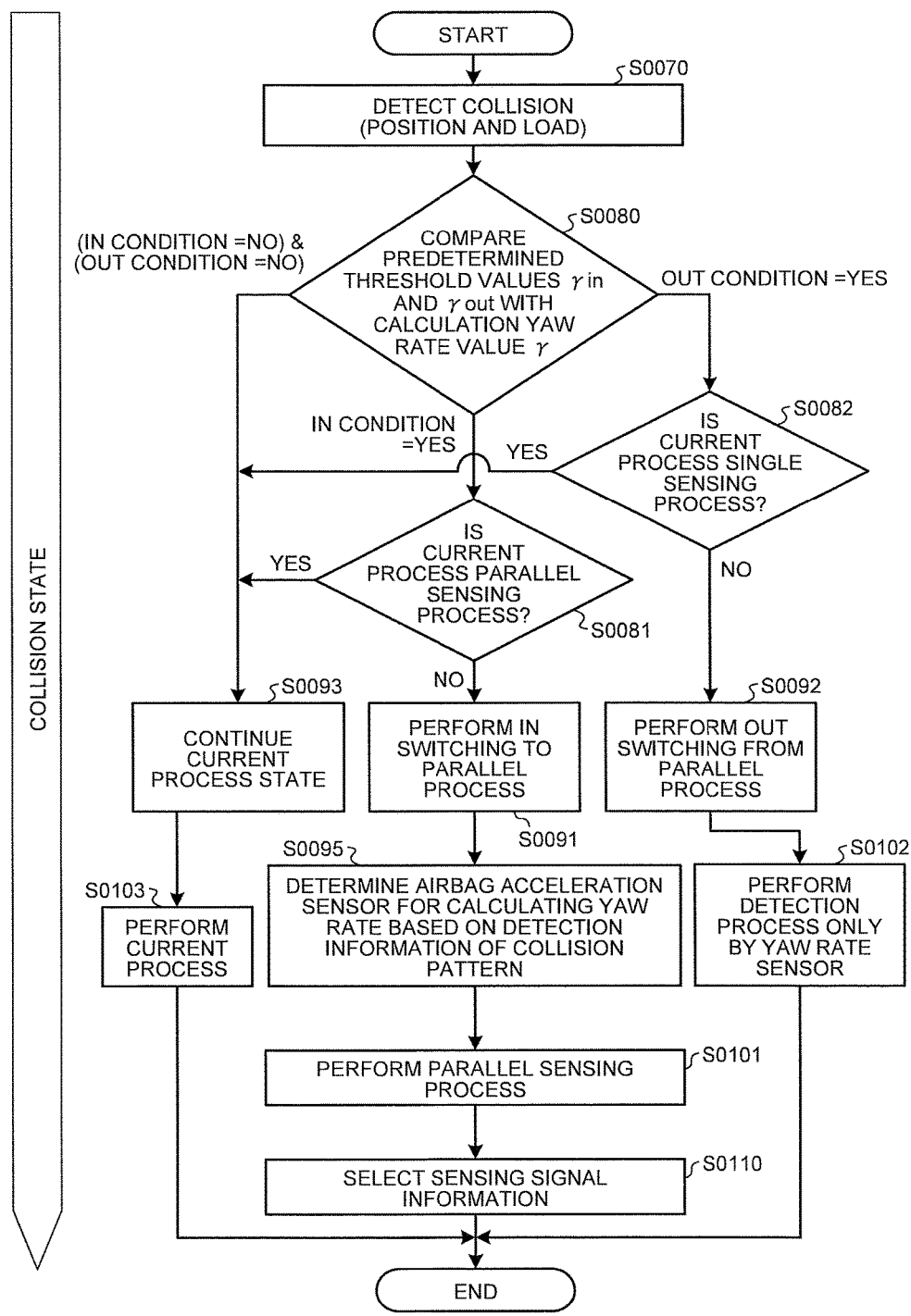
FIG. 17 is a flowchart illustrating an example of a basic process of the vehicle movement state determination device according to the invention in the event of a collision.

The DSS computer 1 performs the pre-collision preventive safety traveling control based on the vehicle movement state amount such as the yaw rate determined by the process of step S0045, the process of step S0052, or the process of step S0053 (step S0060). In step S0060, the DSS computer 1 performs the PCS control based on, for example, the determination that the collision cannot be prevented in step S0010, and decelerates the own vehicle by controlling the brake. At this time, the DSS computer 1 also performs the VSC control. In the PCS control performed in step S0060, the brake control takes priority within the movement range of the VSC control. Specifically, the brake control is performed by determining the target yaw rate as the limitation where the gripping force does not disappear in response to the driver's steering amount in the friction circle (in which the gripping force of the tire is distributed to the front and rear braking/driving forces and the left and right rotation forces). The target yaw rate which is determined at this time is set based on the yaw rate determined by the process of step S0045, the process of step S0052, or the process of step S0053. Subsequently, the present control is terminated. In the embodiment, a pre-collision process illustrated in FIG. 6 is performed, and then the process in the event of the collision illustrated in FIG. 17 is performed.

Figure 16:
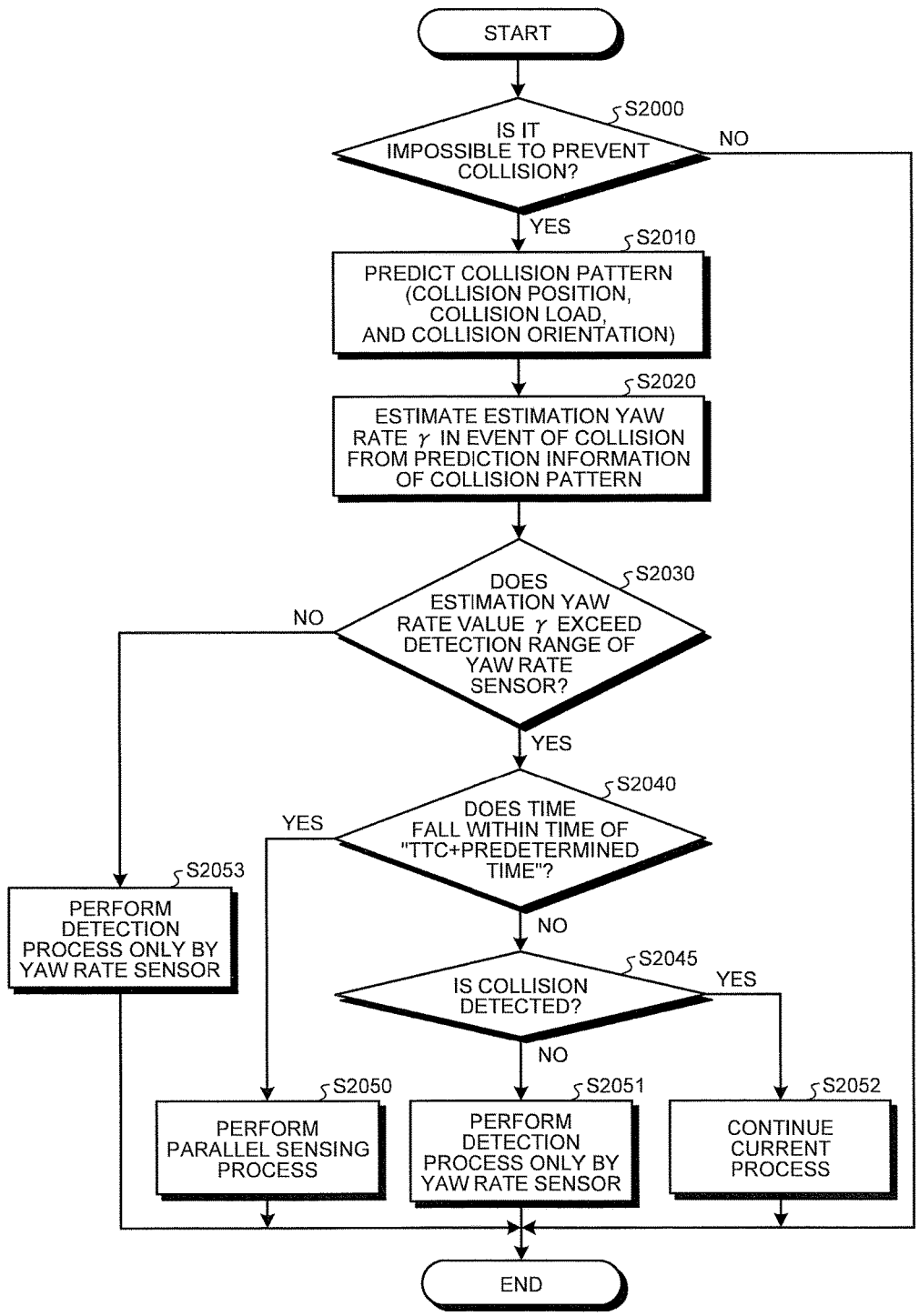
FIG. 16 is a flowchart illustrating an example of a control of determining whether a parallel sensing process is needed.

Furthermore, in the embodiment, a control illustrated in FIG. 16 described below may be performed as a control which is performed by the processes of step S0010 to S0051 except for the process of step S0045 illustrated in FIG. 6. FIG. 16 is a flowchart illustrating an example of a control for determining whether the parallel sensing process is needed.

As illustrated in FIG. 16, the DSS computer 1 determines whether the collision between the vehicle and the obstacle outside the vehicle cannot be prevented based on the information obtained from the object detection sensors such as the milli-wave radar sensor 2, the camera sensor 3, and the clearance sonar sensor 4 (step S2000). In step S2000, for example, the DSS computer 1 determines whether the collision between the vehicle and the obstacle outside the vehicle cannot be prevented based on the information such as the relative position (the coordinate system) between the vehicle and the object, the relative speed (m/s) therebetween, the relative distance (m) therebetween, and the TTC (s) thereof obtained from the object detection sensors. In step S2000, when the DSS computer 1 determines that the non-collision prevention state is not established, that is, the collision may be prevented (S2000: No), the present control is terminated. Meanwhile, when the DSS computer 1 determines that the collision cannot be prevented (S2000: Yes), the process proceeds to S2010.

The DSS computer 1 predicts the collision pattern (the collision position, the collision load, the collision orientation, or the like) based on the information input from the object detection sensor (step S2010). Then, the DSS computer 1 estimates the estimation yaw rate γ in the event of the collision used in the determination process performed in next step S2030 based on the collision pattern prediction information estimated in step S2010 (step S2020). In step S2020, the DSS computer 1 switches the estimation yaw rate map in response to the collision direction (the X and Y axes). The DSS computer 1 estimates the estimation yaw rate γ by using the map illustrated in FIG. 7 in the case of the estimation yaw rate for the collision in the X direction, and estimates the estimation yaw rate γ by using the map illustrated in FIG. 12 in the case of the estimation yaw rate for the collision in the Y direction. Subsequently, the process proceeds to step S2030.

Figure 1:
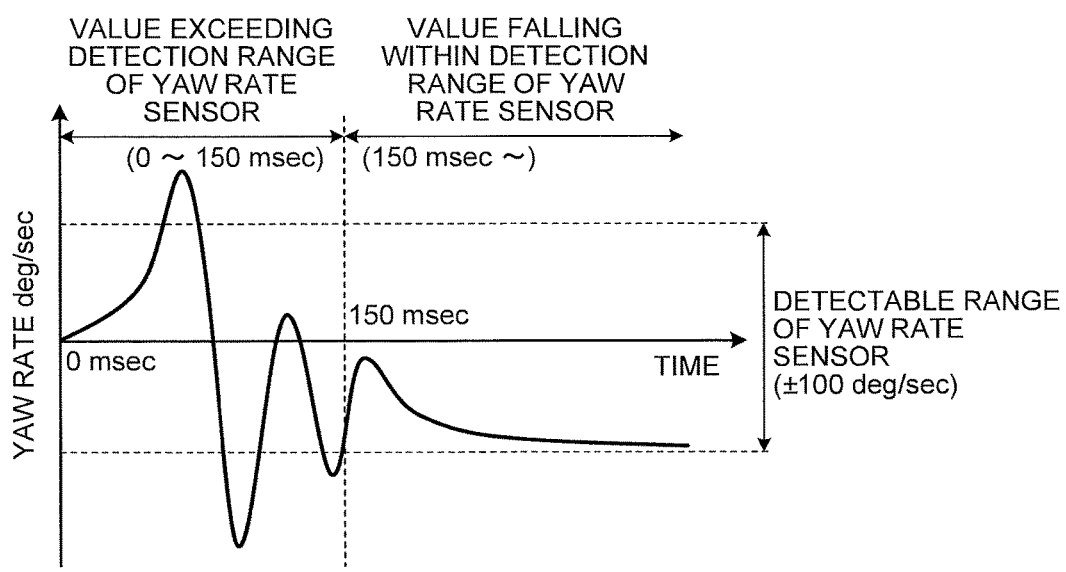
FIG. 1 is a diagram illustrating an example of a yaw rate transition in the event of a collision.

The DSS computer 1 determines whether the estimation yaw rate γ estimated in step S2020 exceeds the detection range of the yaw rate sensor 9 (step S2030). In step S2030, the DSS computer 1 determines whether the estimation yaw rate γ exceeds the detection range of the yaw rate sensor 9 by determining whether, for example, the value of the estimation yaw rate γ falls within the detection range of the yaw rate sensor 9 illustrated in FIG. 1.

In step S2030, when the DSS computer 1 determines that the estimation yaw rate value γ estimated in step S2020 does not exceed the detection range of the yaw rate sensor 9 (step S2030: No), the yaw rate detection process (the single sensing process) is performed only by the yaw rate sensor 9 so as to determine the yaw rate (step S2051). Subsequently, the present control is terminated. Meanwhile, in step S2030, when the DSS computer 1 determines that the estimation yaw rate value γ estimated in step S2020 exceeds the detection range of the yaw rate sensor 9 (step S2030: Yes), it is determined whether the time counted from the time point of the initial determination that the collision cannot be prevented in step S2000 falls within the time of "TTC+ predetermined time" (step S2040). The TTC used in the process of step S2040 is a TTC which is calculated when it is determined that the collision cannot be prevented at the first time by the process of step S2000. In step S2040, the DSS computer 1 determines whether the time counted from the time point of the determination that the collision cannot be prevented exceeds the time (TTC+predetermined time) obtained by adding a predetermined time to the time corresponding to the TTC based on the TTC calculated in step S2000. In other words, the DSS computer 1 determines that it is a time in which the collision is not detected when the time falls within the time of TTC+predetermined time, and determines that it is a time in which the collision is detected when the time is equal to or longer than the time of TTC+predetermined time.

In step S2040, when the DSS computer 1 determines that the time falls within the time of "TTC+predetermined time" (step S2040: Yes), the parallel sensing process is performed so as to determine the yaw rate (step S2050). Subsequently, the present control is terminated.

Meanwhile, in step S2040, when the DSS computer 1 determines that the time does not fall within the time of "TTC+predetermined time", that is, the time exceeds the time of "TTC+predetermined time" (step S2040: No), it is determined whether the collision is detected based on the information obtained from the airbag acceleration sensor 7 as the collision detection sensor (step S2045).

In step S2045, when the DSS computer 1 determines that the collision is not detected (step S2045: No), the yaw rate detection process (the single sensing process) is performed only by the yaw rate sensor 9 so as to determine the yaw rate (step S2051). Subsequently, the present control is terminated. In this way, in the present control, the detection process only using the yaw rate sensor 9 is switched when the collision is not detected even when the time exceeds the prediction time (TTC) to the collision by a predetermined time or more due to a certain reason by the processes of step S2040 and step S2045.

Meanwhile, in step S2045, when the DSS computer 1 determines that the collision is detected (step S2045: Yes), the current state continuation process (for example, the parallel sensing process or the single sensing process) is continued, and the yaw rate is determined (step S2052). Subsequently, the present control is terminated. In the embodiment, the process of step S0060 of FIG. 6 may be performed after the processes of step S2053, step S2050, and step S2051 of FIG. 16.

Subsequently, a process in the event of the collision which is performed after the process before the collision illustrated in FIG. 6 will be described with reference to FIG. 17. FIG. 17 is a flowchart illustrating an example of a basic process in the event of the collision which is performed by the vehicle movement state determination device according to the invention.

As illustrated in FIG. 17, the DSS computer 1 performs the processes of step S0070 to step S0110 as the process in the event of the collision. The DSS computer 1 detects the collision between the vehicle and the obstacle outside the vehicle based on the information obtained from the airbag acceleration sensor 7 as the collision detection sensor (step S0070). In step S0070, the collision determination means of the DSS computer 1 determines presence or absence of the collision between the own vehicle and the obstacle outside the vehicle. Here, the collision determination means determines presence or absence of the collision based on the acceleration detected by the airbag acceleration sensor 7. Further, in step S0070, the DSS computer 1 calculates the yaw rate in the event of the collision by detecting the collision position and the collision load from the detection signals obtained from the object detection sensors (the milli-wave radar sensor 2, the camera sensor 3, the clearance sonar sensor 4, and the like) and the airbag acceleration sensor 7 directly before the collision. In step S0070, the yaw rate calculation unit 1a of the DSS computer 1 calculates the yaw rate generated in the own vehicle based on the acceleration detected by the airbag acceleration sensor 7.

The DSS computer 1 compares the predetermined threshold values γin and γout illustrated in FIG. 16 with the calculation yaw rate value γ calculated in step S0070 (step S0080). In step S0080, the DSS computer 1 determines whether the parallel sensing process needs to be selected by comparing the transition (IN switching)/deviation (OUT switching) determination threshold value of the parallel sensing process performed in step S0101 below with respect to the calculation yaw rate value γ. In step S0080, when the yaw rate reliability determination unit 1c of the DSS computer 1 determines that a collision occurs so as to exceed the detection range of the yaw rate sensor 9 based on the calculation yaw rate calculated by the yaw rate calculation unit 1a based on the acceleration detected by the airbag acceleration sensor 7 in the event of the collision (S0080: IN condition=Yes), it is determined that the reliability of the detection yaw rate detected by the yaw rate sensor 9 is low.

Here, in step S0080, when the DSS computer 1 determines that the transition (IN switching) condition to the parallel sensing process is satisfied as the comparison result of the predetermined threshold values γin and γout with respect to the calculation yaw rate value γ calculated in step S0070 (step S0080: IN condition=Yes), the process proceeds to step S0081 as the next process, and hence it is determined whether the current sensing process state is a state where the parallel sensing process is performed by the yaw rate sensor 9 and the airbag acceleration sensor 7 (step S0081).

In step S0081, when the DSS computer 1 determines that the current sensing process state is a state where the parallel sensing process is performed (step S0081: Yes), the process proceeds to step S0093 as the next process. Meanwhile, when the DSS computer 1 determines that the current sensing process state is not a state where the parallel sensing process is performed (step S0081: No), the process proceeds to step S0091 as the next process, and hence the transition (IN switching) process is performed. Specifically, the DSS computer 1 enables an execution flag for the IN switching process to the parallel sensing process (step S0091). Then, the DSS computer 1 determines the airbag acceleration sensor 7 for calculating the yaw rate of which a possibility of a misalignment, a deformation, or a failure after the collision is low, and with high reliability as the sensor which may have a problem such as a misalignment, a deformation, or a failure after the collision in response to the detection information of the collision pattern including the collision position or the collision load detected in step S0070 (step S0095). In step S0095, the acceleration reliability determination unit 1e of the DSS computer 1 determines the airbag acceleration sensor 7 of which the reliability of the detected acceleration decreases based on the collision position or the like detected in step S0070.

Then, the DSS computer 1 determines the yaw rate which is used in the sensing signal information selection process performed in next step S0110 by performing the parallel sensing process using the airbag acceleration sensor 7 determined in step S0095 (step S0101). In step S0101, the yaw rate determination unit 1b of the DSS computer 1 determines the yaw rate generated in the own vehicle based on the calculation yaw rate calculated by the yaw rate calculation unit 1a which calculates the yaw rate generated in the own vehicle based on the detection yaw rate detected by the yaw rate sensor 9 detecting the yaw rate generated in the own vehicle and the acceleration detected by the airbag acceleration sensor 7. Here, in the parallel sensing process performed in step S0101, the yaw rate calculation unit 1a of the DSS computer 1 calculates the yaw rate generated in the own vehicle as the calculation yaw rate based on the acceleration detected by the airbag acceleration sensor 7 which is not determined as the airbag acceleration sensor 7 of which the reliability of the detected acceleration decreases by the acceleration reliability determination unit 1e in step S0095.

Then, the DSS computer 1 determines the yaw rate by selecting a sensor signal of which the resolution or the detection range is most suitable based on the collision pattern among the surviving airbag acceleration sensor 7 (step S0110). In step S0110, the yaw rate determination unit 1b of the DSS computer 1 determines the yaw rate generated in the own vehicle based on the calculation yaw rate calculated by the yaw rate calculation unit 1a when the yaw rate reliability determination unit 1c determines that the reliability of the detection yaw rate detected by the yaw rate sensor 9 is low in step S0080 (in FIG. 17, when it is determined that a collision occurs so as to exceed the detection range of the yaw rate sensor 9). Subsequently, the present control is terminated.

Further, in step S0080, when the DSS computer 1 determines that the deviation (OUT switching) condition from the parallel sensing process is satisfied as the comparison result of the predetermined threshold values γin and γout with respect to the calculation yaw rate value γ calculated in step S0070 (step S0080: OUT condition=Yes), the process proceeds to step S0082 as the next process, and hence it is determined whether the current sensing process state is a state where the single sensing process is performed only by the yaw rate sensor 9 (step S0082).

In step S0082, when the DSS computer 1 determines that the current sensing process state is a state where the single sensing process is performed (step S0082: Yes), the process proceeds to step S0093 as the next process. Meanwhile, when the DSS computer 1 determines that the current sensing process state is not a state where the single sensing process is performed (step S0082: No), the process proceeds to step S0092 as the next process, and hence the deviation (OUT switching) process is performed. Specifically, the DSS computer 1 enables an execution flag of the OUT switching process from the parallel sensing process (step S0092). Then, the DSS computer 1 determines the yaw rate by performing the yaw rate detection process (the single sensing process) only by the yaw rate sensor 9 (step S0102). In step S0102, the yaw rate determination unit 1b of the DSS computer 1 determines the detection yaw rate detected by the yaw rate sensor 9 as the yaw rate generated in the own vehicle when the yaw rate reliability determination unit 1c does not determine that the reliability of the detection yaw rate detected by the yaw rate sensor 9 is low (in FIG. 17, when it is not determined that a collision occurs so as to exceed the detection range of the yaw rate sensor 9 although a collision is detected) in step S0080. Subsequently, the present control is terminated.

Further, in step S0080, when the DSS computer 1 determines that the transition (IN switching) condition to the parallel sensing process is not satisfied and the deviation (OUT switching) condition from the parallel sensing process is not also satisfied as the comparison result of the predetermined threshold values γin and γout with respect to the calculation yaw rate value γ calculated in step S0070, (step S0080: (IN condition=No) & (OUT condition=No)), the process proceeds to step S0093 as the next process, and hence the current state continuation process is performed. Specifically, the DSS computer 1 enables a current state continuation flag for continuing the current sensing process state (for example, the parallel sensing process using the yaw rate sensor 9 and the airbag acceleration sensor 7 or the single sensing process only using the yaw rate sensor 9) (step S0093). Then, the DSS computer 1 maintains the current state continuation process (for example, the parallel sensing process or the single sensing process) (step S0103). Subsequently, the present control is terminated. In the embodiment, a post-collision process illustrated in FIG. 26 below is performed after the process in the event of the collision illustrated in FIG. 17 is performed.

As described above, in the embodiment, the DSS computer 1 determines whether the parallel sensing process needs to be performed using the airbag acceleration sensor 7 and the yaw rate sensor 9 by estimating the estimation yaw rate in the event of the collision as illustrated in FIG. 6. However, a hysteresis is so that any hunting does not occur in the transition (IN switching) condition to the parallel sensing process and the deviation (OUT switching) condition from the parallel sensing process. Further, the IN switching condition and the OUT switching condition are switched in response to the collision occurrence time or the peripheral traveling environment. In this way, since the parallel sensing process for the yaw rate is performed from the time before the collision, the yaw rate can be continuously detected before and after the collision as illustrated in FIGS. 6 and 17, and hence a feed-back control for the vehicle movement can be continuously performed based on this result. Further, since the parallel sensing process operation time can be limited before and after the collision, the ECU process load can be reduced.

Figure 18:
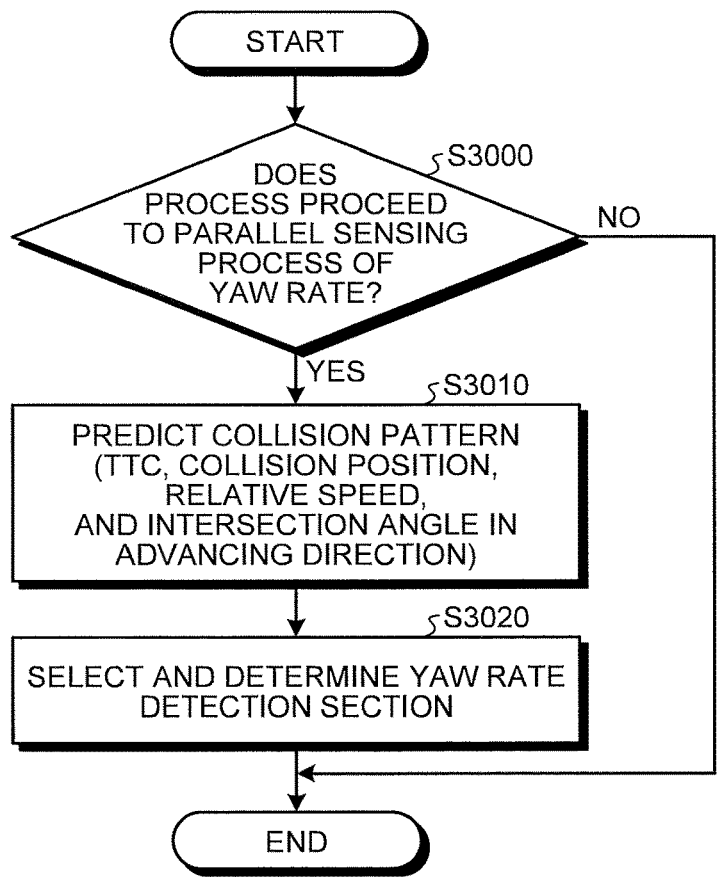
FIG. 18 is a flowchart illustrating an example of a control of selecting and determining process a yaw rate detection means in response to a collision prediction pattern.

Subsequently, a control which is performed by the processes of step S0045 illustrated in FIG. 6 and step S0095 illustrated in FIG. 17 will be described in detail with reference to FIGS. 18 to 25. FIG. 18 is a flowchart illustrating an example of a control of selecting and determining the yaw rate detection means in response to the collision prediction pattern.

As illustrated in FIG. 18, the DSS computer 1 determines whether the parallel sensing process for the yaw rate is performed (step S3000). In step S3000, when the DSS computer 1 checks an execution flag of the IN switching process to the parallel sensing process enabled in step S0041 of FIG. 6 under the condition in which the collision cannot be prevented by the determination in step S0010 of FIG. 6, it is determined that the parallel sensing process for the yaw rate is performed.

In step S3000, when the DSS computer 1 determines that the process does not proceed to the parallel sensing process for the yaw rate (step S3000: No), the present control is terminated. Meanwhile, when the DSS computer 1 determines that the process proceeds to the parallel sensing process for the yaw rate (step S3000: Yes), the collision pattern (the TTC, the collision position, the relative speed, the intersection angle in the advancing direction, or the like) is predicted from the information input from the object detection sensor (step S3010). Then, the DSS computer 1 selects and determines the yaw rate detection means based on the collision pattern prediction information estimated in step S3010 and the detection range or the resolution of each yaw rate detection method (step S3020). Subsequently, the present control is terminated.

Figure 19:
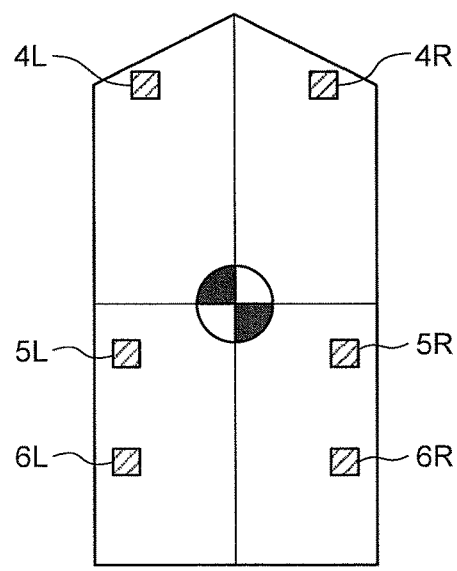
FIG. 19 is a diagram illustrating a mounting position example of an airbag acceleration sensor.
Figure 22:
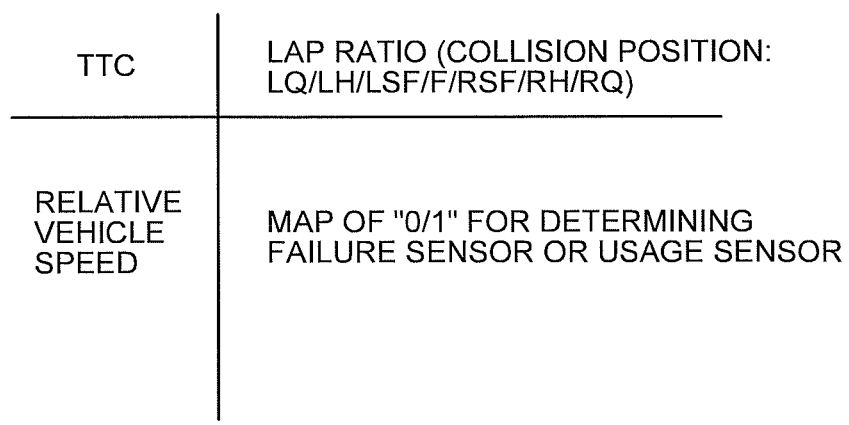
FIG. 22 is an example of a determination map for a switching of a yaw rate detection means by the prediction of the front collision.
Figure 23:
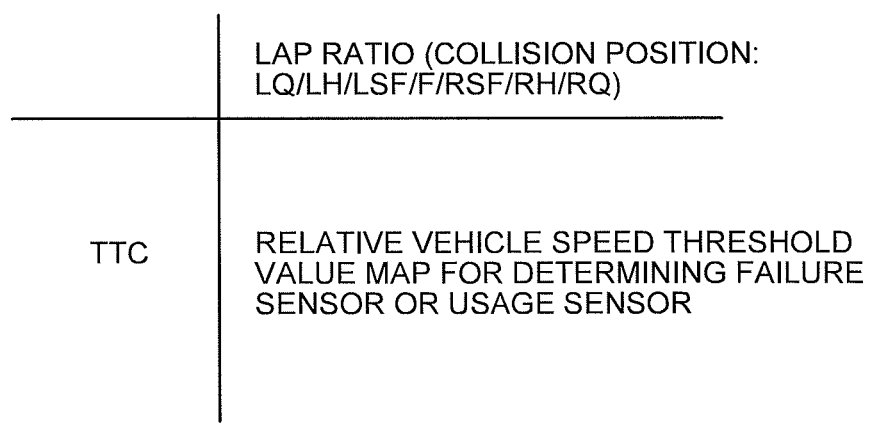
FIG. 23 is another example of a determination map for a switching of a yaw rate detection means by the prediction of the front collision.

Here, an example of a method of selecting and determining the yaw rate detection means performed in step S3020 will be described with reference to FIGS. 19 to 25. FIG. 19 is a diagram illustrating a mounting position example of the airbag acceleration sensor. FIG. 20 is an example of a table for determining a failure sensor and a usage sensor in response to a collision position when a front collision is predicted. FIG. 21 is an example of a table for determining a failure sensor and a usage sensor in response to a collision position when a side collision is predicted. FIG. 22 is an example of a determination map for a switching of a yaw rate detection means by the prediction of the front collision. FIG. 23 is another example of a determination map for a switching of a yaw rate detection means by the prediction of the front collision. FIG. 24 is an example of a determination map for a switching of a yaw rate detection means by the prediction of the side collision. FIG. 25 is another example of a determination map for a switching of a yaw rate detection means by the prediction of the side collision.

In FIG. 19, reference sign 4L indicates the front airbag acceleration sensor 7a-1 which is mounted on the left side of the front surface of the vehicle. Reference sign 4R indicates the front airbag acceleration sensor 7a-2 which is mounted on the right side of the front surface of the vehicle. Reference sign 5L indicates the side airbag acceleration sensor 7b-1 which is mounted on the left side of the side surface of the vehicle. Reference sign 5R indicates the side airbag acceleration sensor 7b-2 which is mounted on the right side of the side surface of the vehicle. Reference sign 6L indicates the rear airbag acceleration sensor 7c-1 which is mounted on the left side of the rear surface of the vehicle. Reference sign 6R indicates the rear airbag acceleration sensor 7c-2 which is mounted on the right side of the rear surface of the vehicle.

The DSS computer 1 specifies a collision position from the collision pattern prediction information, and selects and determines a failure sensor and a usage sensor predicted in response to the specified collision position. For example, when the DSS computer 1 predicts the front collision, the failure sensor and the usage sensor are selected and determined based on the table illustrated in FIG. 20. Specifically, the DSS computer 1 determines that the failure sensor is 4L and the usage sensors are 4R, 6L, and 6R when the collision position is LQ (left: 25%). Then, the DSS computer 1 selects the front airbag acceleration sensor 7a-2 and the rear airbag acceleration sensors 7c-1 and 2 respectively corresponding to 4R, 6L, and 6R as the yaw rate detection means. Further, the DSS computer 1 determines that the failure sensors are 4L and 4R and the usage sensors are 6L and 6R when the collision positions are LH (left: 40%), LSF (left: 70%), F (100%), RSF (right: 70%), and RH (right: 40%). Then, the DSS computer 1 selects the rear airbag acceleration sensors 7c-1 and 2 respectively corresponding to 6L and 6R as the yaw rate detection means. Further, the DSS computer 1 determines that the failure sensor is 4R and the usage sensors are 4L, 6L, and 6R when the collision position is RQ (right: 25%). Then, the DSS computer 1 selects the front airbag acceleration sensor 7a-1 and the rear airbag acceleration sensors 7c-1 and 7c-2 respectively corresponding to 4L, 6L, and 6R as the yaw rate detection means. In this way, the DSS computer 1 selects the sensors (6L and 6R) located in at least the rear portion of the vehicle as the usage sensors when the front collision is predicted.

Further, for example, when the DSS computer 1 predicts the side collision (in FIG. 21, when it is predicted that the side collision occurs from the left side of the own vehicle), the failure sensor and the usage sensor are selected and determined based on the table illustrated in FIG. 21. Specifically, the DSS computer 1 determines that the failure sensors are 4L and 4R and the usage sensors are 6L and 6R when the collision position is E (the engine compartment). Then, the DSS computer 1 selects the rear airbag acceleration sensors 7c-1 and 7c-2 respectively corresponding to 6L and 6R as the yaw rate detection means. Further, the DSS computer 1 determines that the failure sensors are 4L and 5L and the usage sensors are 4R, 6L, and 6R when the collision position is A (the A-pillar). Then, the DSS computer 1 selects the front airbag acceleration sensor 7a-1 and the rear airbag acceleration sensors 7c-1 and 7c-2 respectively corresponding to 4R, 6L, and 6R as the yaw rate detection means. Further, the DSS computer 1 determines that the failure sensors are 5L and 6L and the usage sensors are 4R, 4L, and 6R when the collision positions are B (the B-pillar) and C (the C-pillar). Then, the DSS computer 1 selects the front airbag acceleration sensors 7a-1 and 7a-2 and the rear airbag acceleration sensor 7c-2 respectively corresponding to 4R, 4L, and 6R as the yaw rate detection means. Further, the DSS computer 1 determines that the failure sensor is 6L and the usage sensors are 4L, 4R, and 6R when the collision position is L (the luggage). Then, the DSS computer 1 selects the front airbag acceleration sensors 7a-1 and 7a-2 and the rear airbag acceleration sensor 7c-2 respectively corresponding to 4L, 4R, and 6R as the yaw rate detection means. Furthermore, in the embodiment, it is assumed that the values of all airbag acceleration sensors 7 are reliable in the event of the collision.

Additionally, in the embodiment, the DSS computer 1 may select the yaw rate detection means by using the determination map for the failure sensor or the usage sensor illustrated in FIG. 22 when it is predicted that the front collision occurs. In the map of FIG. 22, the relative vehicle speed is set in the vertical axis, and the lap ratios (the collision positions: LQ/LH/LSF/F/RSF/RH/RQ) is set in the horizontal axis. The lap ratio mentioned herein is an index indicating the range of the collision portion of the own vehicle when the own vehicle collides with the relative vehicle (see FIGS. 9 and 10). In the map of "0/1" for determining the failure sensor or the usage sensor illustrated in the map of FIG. 22, the relative vehicle speed of the vertical axis and the lap ratio (the collision position) of the horizontal axis are set in advance. In the map of "0/1", "0" is set to the failure sensor, and "1" is set to the usage sensor. Further, the failure sensor and the usage sensor are different for each of the lap ratios (the collision positions: LQ/LH/LSF/F/RSF/RH/RQ) as illustrated in FIG. 20, and are also different in response to the relative vehicle speed. For that reason, in the map of FIG. 22, various combinations of the relative vehicle speed and the lap ratio (the collision position) are simulated or verified in advance by a collision test or the like as the map of "0/1" for determining the failure sensor or the usage sensor.

Further, the map of FIG. 22 is switched in response to the TTC. When it is predicted that the front collision occurs, the DSS computer 1 estimates the TTC based on the collision pattern prediction information obtained by the object detection sensor and selects the determination map for the failure sensor or the usage sensor in the front collision from the lap ratio (the collision position) and the relative vehicle speed in response to the TTC. Then, the DSS computer 1 determines the map of "0/1" for determining the failure sensor or the usage sensor correlated to a combination which is set such that the relative vehicle speed is set as the input value in the vertical axis and the lap ratio (the collision position) is set as the input value in the horizontal axis in the switched map. Then, the DSS computer 1 selects the usage sensor set to "1" as the yaw rate detection means by referring to the determined map of "0/1".

Further, for example, when it is predicted that the front collision occurs, the DSS computer 1 may select the yaw rate detection means by using the determination map for the failure sensor or the usage sensor illustrated in FIG. 23. In the map of FIG. 23, the TTC is set in the vertical axis, and the lap ratio (the collision positions: LQ/LH/LSF/F/RSF/RH/RQ) is set in the horizontal axis. In the relative vehicle speed threshold value map for determining the failure sensor or the usage sensor illustrated in the map of FIG. 23, a value is set in advance in response to the TTC of the vertical axis and the lap ratio (the collision position) of the horizontal axis. The relative vehicle speed threshold value map illustrates a failure sensor which is considered to be broken in the event of the collision at the relative vehicle speed equal to or larger than a predetermined threshold value and a usage sensor which is considered not to be broken in the event of the collision at the relative vehicle speed smaller than a predetermined threshold value. In the map of FIG. 23, various combinations of the relative vehicle speed and the lap ratio (the collision position) are simulated or verified in advance by a collision test or the like as the relative vehicle speed threshold value map for determining the failure sensor or the usage sensor.

When it is predicted that the front collision occurs, the DSS computer 1 determines the relative vehicle speed threshold value map for determining the failure sensor or the usage sensor correlated to a combination which is set such that the TTC is set as the input value in the vertical axis and the lap ratio (the collision position) is set as the input value in the horizontal axis based on the collision pattern prediction information obtained by the object detection sensor. Then, the DSS computer 1 selects the usage sensor in which the relative vehicle speed becomes smaller than a predetermined threshold value based on the collision pattern prediction information obtained by the object detection sensor as the yaw rate detection means by referring to the threshold value map for the determined relative vehicle speed.

Further, in the embodiment, when it is predicted that the side collision occurs (for example, when it is predicted that the side collision occurs from the left side of the own vehicle), the DSS computer 1 may sect the yaw rate detection means by using the determination map for the failure sensor or the usage sensor illustrated in FIG. 24. In the map of FIG. 24, the relative vehicle speed is set in the vertical axis, and the own vehicle speed is set in the horizontal axis. In the map of "0/1" for determining the failure sensor or the usage sensor illustrated in the map of FIG. 24, a value is set in advance in response to the relative vehicle speed of the vertical axis and the own vehicle speed of the horizontal axis. In the map of "0/1", the failure sensor is set to "0", and the usage sensor is set to "1". In the map of FIG. 24, various combinations of the relative vehicle speed and the own vehicle speed are simulated or verified in advance by a collision test or the like as the map of "0/1" for determining the failure sensor or the usage sensor.

Further, the map of FIG. 24 is switched in response to the collision position (see FIG. 21). When it is predicted that the side collision occurs, the DSS computer 1 estimates the collision position based on the collision pattern prediction information obtained by the object detection sensor, and switches the determination map for the failure sensor or the usage sensor in the side collision determined from the own vehicle speed and the relative vehicle speed in response to the collision position. Then, the DSS computer 1 determines the map of "0/1" for determining the failure sensor or the usage sensor correlated to a combination which is set such that the relative vehicle speed is set as the input value in the vertical axis and the own vehicle speed is set as the input value in the horizontal axis in the switched map. Then, the DSS computer 1 selects the usage sensor set to "1" as the yaw rate detection means by referring to the determined map of "0/1".

Further, for example, when it is predicted that the side collision occurs, the DSS computer 1 may select the yaw rate detection means by using the determination map for the failure sensor or the usage sensor illustrated in FIG. 25. In the map of FIG. 25, the own vehicle speed is set in the vertical axis, and the lap ratio (the collision positions: E/A/B/C/L) is set in the horizontal axis. In the relative vehicle speed threshold value map for determining the failure sensor or the usage sensor illustrated in the map of FIG. 25, a value is set in advance in response to the own vehicle speed of the vertical axis and the lap ratio (the collision position) of the horizontal axis. The relative vehicle speed threshold value map illustrates a failure sensor which is considered to be broken in the event of the collision at the relative vehicle speed equal to or larger than a predetermined threshold value and a usage sensor which is considered not to be broken in the event of the collision at the relative vehicle speed smaller than a predetermined threshold value. In the map of FIG. 25, various combinations of the relative vehicle speed and the lap ratio (the collision position) are simulated or verified in advance by a collision test or the like as the relative vehicle speed threshold value map for determining the failure sensor or the usage sensor.

When it is predicted that the side collision occurs, the DSS computer 1 determines the relative vehicle speed threshold value map for determining the failure sensor or the usage sensor correlated to a combination which is set such that the own vehicle speed is set as the input value in the vertical axis and the lap ratio (the collision position) is set as the input value in the horizontal axis based on the collision pattern prediction information obtained by the object detection sensor. Then, the DSS computer 1 selects the usage sensor in which the relative vehicle speed becomes smaller than a predetermined threshold value based on the collision pattern prediction information obtained by the object detection sensor as the yaw rate detection means by referring to the threshold value map for the determined relative vehicle speed.

Although FIG. 18 is a flowchart illustrating an example of a control of switching the yaw rate detection means by the prediction of the collision performed in step S0045 of FIG. 6, a control of switching the yaw rate detection means by the detection of the collision performed in step S0095 of FIG. 17 is also basically the same as the above-described control except that the detection information is used other than the collision pattern prediction information. In the embodiment, in the control of switching the yaw rate detection means by the prediction of the collision before the collision, the collision is calculated by a predetermined condition (for example, a condition of a rigid-body approximation, a condition in which the height is the same in the same shape, or a condition in which the energy is absorbed by the deformation of the vehicle body) so that the parallel sensing process is easily performed. For that reason, a threshold value is set so that the parallel sensing process is easily performed, and is calculated so that a large load (acceleration) is output by the collision. Accordingly, the failure determination on the sensor becomes strict. Therefore, in the embodiment, in the control of switching the yaw rate detection means by the detection of the collision, the sensor surviving state is re-examined from the actual load (the acceleration) so that the switching of the yaw rate detection means is determined again.

As described above, in the embodiment, the DSS computer 1 determines the airbag acceleration sensor 7 of which the possibility of a misalignment, a deformation, or a failure in the event of the collision is low by predicting the collision portion or the collision load from the prediction information obtained from the object detection sensor (the milli-wave radar sensor 2, the camera sensor 3, the clearance sonar sensor 4, or the like) before the collision occurs and estimating the collision pattern from prediction information directly before the collision and the detection information in the event of the collision after the collision occurs. In this way, since the collision pattern is estimated before the collision and the sensing information having a high possibility of the abnormality (for example, a misalignment, a deformation, a failure, or the like) due to the collision is selected, the movement control may be performed only by using the sensing information with high reliability, and the ECU process load may be also reduced.

Figure 26:
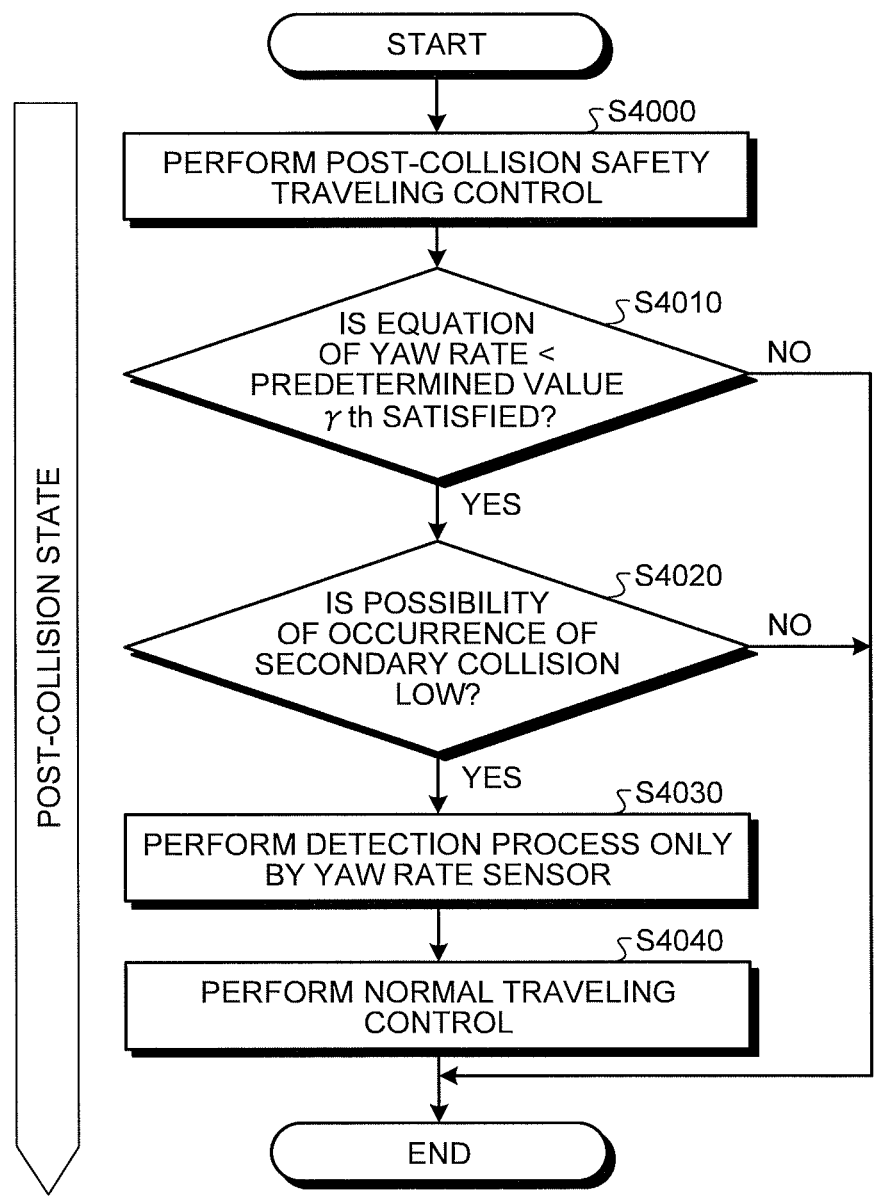
FIG. 26 is a flowchart illustrating an example of a basic process of the vehicle movement state determination device and the vehicle movement control device according to the invention after a collision occurs.

Subsequently, a post-collision process which is performed after the process in the event of the collision illustrated in FIG. 17 will be described with reference to FIGS. 26 to 29. FIG. 26 is a flowchart illustrating an example of a basic process of the vehicle movement state determination device and the vehicle movement control device according to the invention after the collision.

As illustrated in FIG. 26, the DSS computer 1 performs a post-collision safety traveling control by performing a safety traveling control after the primary collision so that the secondary collision damage becomes minimal (step S4000). In step S4000, the DSS computer 1 performs the movement control of the own vehicle by performing the LKA control or the VSC control as the safety traveling control based on the yaw rate determined by the yaw rate determination unit 1b using the process in the event of the collision (for example, any one of the processes of step S0103, step S0110, and step S0102 illustrated in FIG. 17) illustrated in FIG. 17. In the LKA control performed in step S4000, the brake control takes priority in the range of the VSC control. Specifically, the brake control is performed by determining the target yaw rate as the limitation where the gripping force does not disappear in response to the driver's steering amount in the friction circle (in which the gripping force of the tire is distributed to the front and rear braking/driving forces and the left and right rotation forces). The target yaw rate which is set at this time is obtained based on the yaw rate determined by the process in the event of the collision illustrated in FIG. 17. Subsequently, the process proceeds to step S4010. In step S4000, the movement control unit 1h of the DSS computer 1 performs the movement control of the own vehicle based on the yaw rate determined by the yaw rate determination unit 1b using the process in the event of the collision illustrated in FIG. 17.

The DSS computer 1 determines whether the yaw rate becomes smaller than the predetermined value γth by stabilizing the vehicle behavior (step S4010). Here, the predetermined value γth is a yaw rate threshold value for determining whether to stop the parallel sensing process with the stabilization of the vehicle behavior after the collision. In step S4010, the DSS computer 1 determines whether the yaw rate value calculated based on the acceleration detected by the airbag acceleration sensor 7 falls within the detectable range of the movement control yaw rate sensor 9 (that is, the vehicle behavior is settled). Further, in step S4010, the DSS computer 1 determines whether there is the possibility of the occurrence of the secondary collision in response to the traffic state of the peripheral traffic environment, and determines whether the parallel sensing process may be returned to the movement control based on the yaw rate sensor signal.

In step S4010, when the DSS computer 1 determines that the yaw rate is equal to or larger than the predetermined value γth (step S4010: No), the present control is terminated.

Meanwhile, in step S4010, when the DSS computer 1 determines that the yaw rate is smaller than the predetermined value γth (step S4010: Yes), it is determined whether the possibility of the occurrence of the secondary collision is low (step S4020). In step S4020, the DSS computer 1 determines the possibility of the occurrence of the secondary collision based on the peripheral traffic environment and the own vehicle state.

Figure 27:
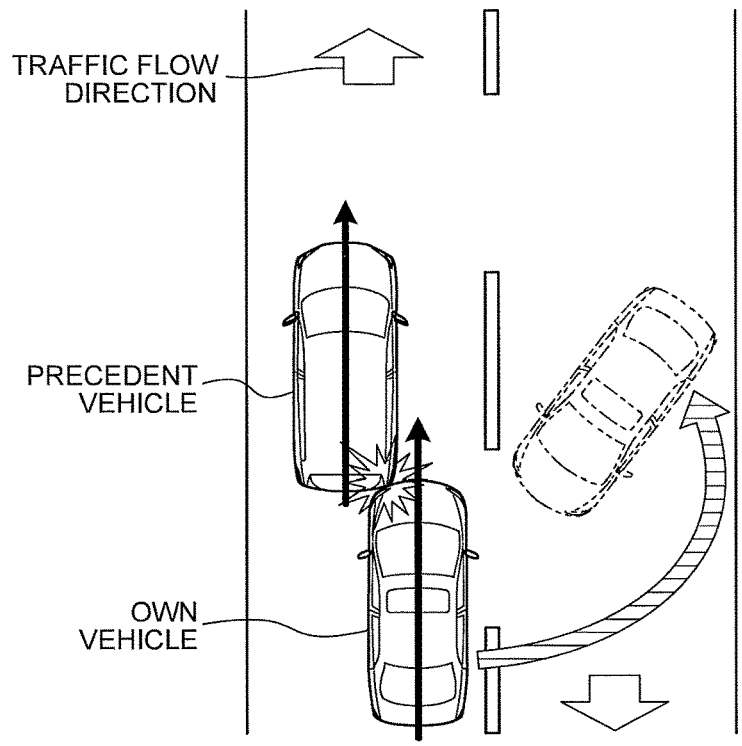
FIG. 27 is a diagram illustrating an example of a scene in which a secondary collision occurrence possibility is low.
Figure 28:
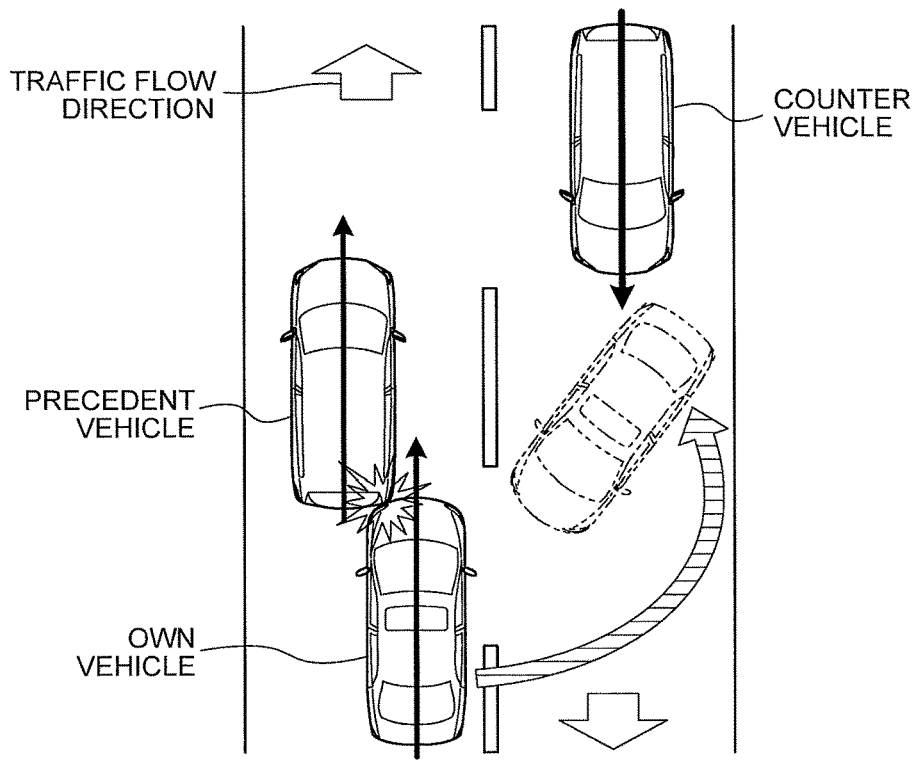
FIG. 28 is a diagram illustrating an example of a scene in which a secondary collision occurrence possibility is high.

Here, an example of a process of determining the possibility of the occurrence of the secondary collision performed in step S4020 will be described with reference to FIGS. 27 and 28. FIG. 27 is a diagram illustrating an example of a scene in which the possibility of the occurrence of the secondary collision is low. FIG. 28 is a diagram illustrating an example of a scene in which the possibility of the occurrence of the secondary collision is high. FIGS. 27 and 28 illustrate a state where the own vehicle traveling along the left lane collides with the precedent vehicle (after the occurrence of the primary collision) and is deviated to the opposite right lane. In the state illustrated in FIG. 27, the counter vehicle does not exist on the opposite lane as the deviation place. In such a case, since there is a low risk that the own vehicle collides with the counter vehicle at the opposite lane of the deviation place, the possibility of the occurrence of the secondary collision decreases. Meanwhile, in the state illustrated in FIG. 28, the counter vehicle travels along the opposite lane of the deviation place. In such a case, since there is a high risk that the own vehicle collides with the counter vehicle on the opposite lane as the deviation place, the possibility of the occurrence of the secondary collision increases. The DSS computer 1 determines the possibility of the occurrence of the secondary collision by determining whether the possibility of the occurrence of the secondary collision is low as illustrated in FIG. 27 or the possibility of the occurrence of the secondary collision is high as illustrated in FIG. 28 based on the peripheral environment recognition information (for example, an information on the relative speed of the peripheral object, the relative position of the peripheral object, or a white line position) or the inertia position recognition information or the own vehicle position recognition information (for example, an information on the vehicle posture of the own vehicle or the vehicle position) dynamically detected by various sensors mounted on the own vehicle directly before the collision.

Returning to FIG. 26, when the DSS computer 1 determines that the possibility of the occurrence of the secondary collision is high in step S4020 (step S4020: No), the present control is terminated. Meanwhile, when the DSS computer 1 determines that the possibility of the occurrence of the secondary collision is low in step S4020 (step S4020: Yes), the DSS computer performs the yaw rate detection process (the single sensing process) only by the yaw rate sensor 9, and determines the yaw rate used in the normal traveling control performed in next step S4040 (step S4030). Then, the DSS computer 1 performs the normal traveling control by performing the safety traveling control using the yaw rate value detected by the movement control yaw rate sensor 9 by the use of the yaw rate determined in step S4030 (step S4040). Subsequently, the present control is terminated.

Figure 29:
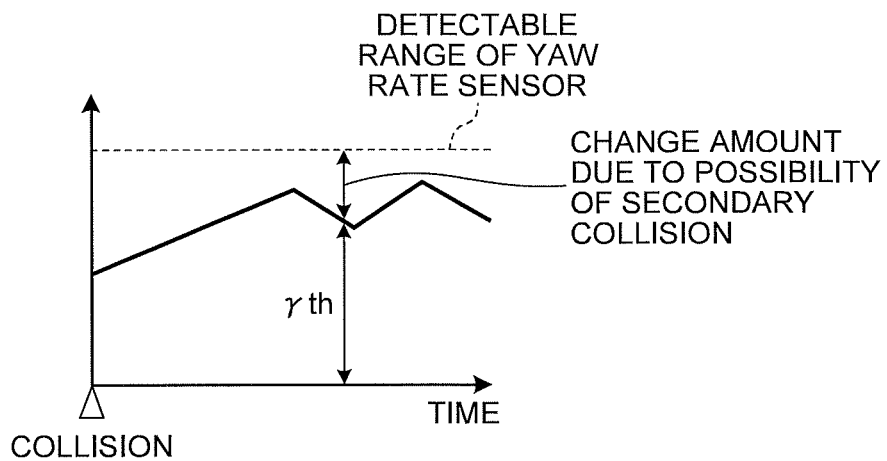
FIG. 29 is a diagram illustrating an example of a transition of a predetermined value γth due to the possibility of the occurrence of the secondary collision.

Furthermore, in the embodiment, the process of determining the possibility of the occurrence of the secondary collision may be performed along with the determination process of the predetermined value γth in step S4000. In this case, the DSS computer 1 may shift the predetermined value γth in response to the possibility of the occurrence of the secondary collision as illustrated in FIG. 29. FIG. 29 is a diagram illustrating an example of the transition of the predetermined value γth due to the possibility of the occurrence of the secondary collision. As illustrated in FIG. 29, since the predetermined value γth set within the detectable range of the yaw rate sensor decreases by a change amount of the possibility of the occurrence of the secondary collision when the possibility of the occurrence of the secondary collision increases, the parallel sensing process may be easily continued.

As described above, in the embodiment, there is a need to detect the yaw rate by the yaw rate sensor with high resolution and to continue the parallel sensing process due to the possibility of the occurrence of the secondary collision as the vehicle behavior is stabilized after the primary collision. Therefore, the DSS computer 1 switches the yaw rate threshold value for determining whether to cancel the parallel sensing process after the primary collision in response to the possibility of the occurrence of the secondary collision which is determined from the peripheral traffic environment information, the own vehicle position information, and the own vehicle movement state amount. Accordingly, it is possible to perform the safety traveling control with high precision based on the high-resolution yaw rate with the stabilization of the vehicle behavior after the primary collision and to continue the parallel sensing process in response to the possibility of the occurrence of the secondary collision.

Figure 30:
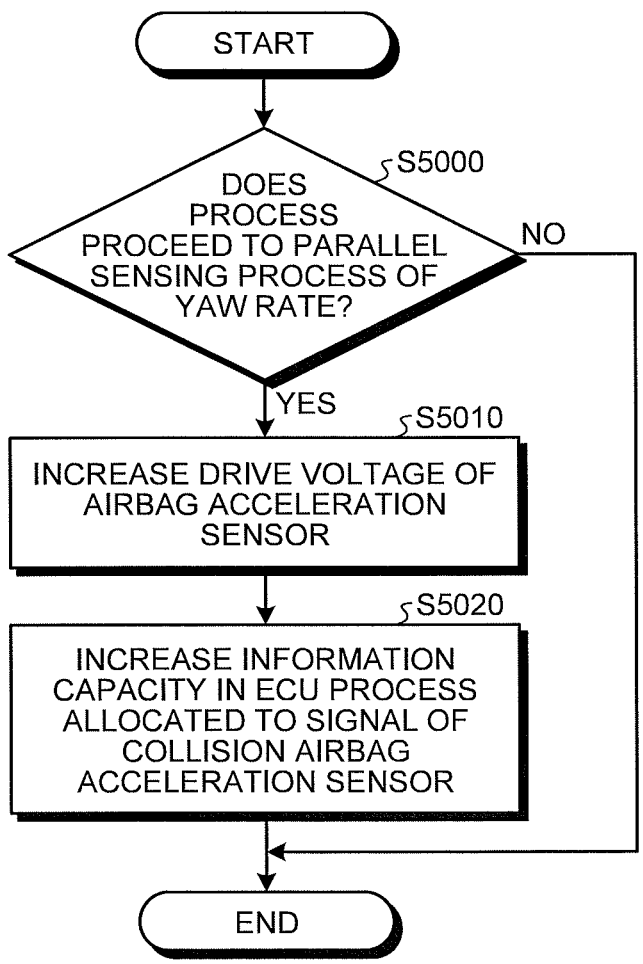
FIG. 30 is a flowchart illustrating an example of a control of switching an input process of an airbag acceleration sensor in the event of a collision.
Figure 31:
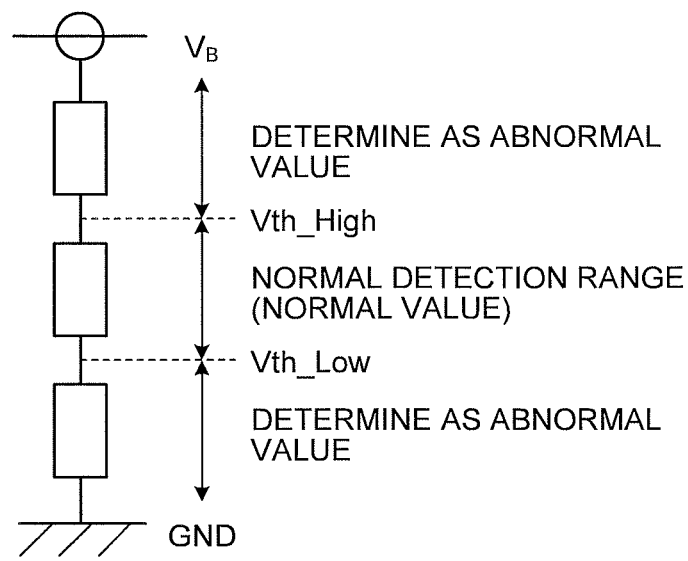
FIG. 31 is a diagram illustrating a circuit design example of a sensor input unit.

Subsequently, a control which is performed by the processes of step S0051 illustrated in FIG. 6 and step S0101 illustrated in FIG. 17 will be described in detail with reference to FIGS. 30 and 31. FIG. 30 is a flowchart illustrating an example of a control which switches the input process of the airbag acceleration sensor in the event of the collision. FIG. 31 is a diagram illustrating a circuit design example of the sensor input unit.

As illustrated in FIG. 30, the DSS computer 1 determines whether to proceed the parallel sensing process for the yaw rate (step S5000). In step S5000, the DSS computer 1 determines that the process proceeds to the parallel sensing process for the yaw rate when the execution flag for the IN switching process to the parallel sensing process enabled in step S0041 of FIG. 6 or step S0091 of FIG. 17 is checked.

In step S5000, when the DSS computer 1 determines that the process does not proceed to the parallel sensing process for the yaw rate (step S5000: No), the present control is terminated. Meanwhile, when the DSS computer 1 determines that the process proceeds to the parallel sensing process for the yaw rate (step S5000: Yes), the drive voltage of the airbag acceleration sensor 7 as the collision detection sensor is increased (step S5010). For example, in the embodiment, the circuit design of the input unit of the airbag acceleration sensor 7 is designed so that the normal detection range (the normal value) of the airbag acceleration sensor 7 as the collision detection sensor is set to a value between Vth_High and Vth_Low as illustrated in FIG. 31. Further, the circuit design is designed so that an abnormal value is obtained when the drive voltage $V_B$ is larger than Vth_High and an abnormal value is obtained when the drive voltage $V_B$ is smaller than Vth_Low. Therefore, in step S5010, when the DSS computer 1 determines that the process proceeds to the parallel sensing process, the drive voltage $V_B$ of the yaw rate sensor is increased from the normal value (for example, 5.0 V). In this way, the voltage control unit 1f in the DSS computer 1 detects the acceleration in response to a change in the other electrostatic capacity when a drive voltage is applied to any one of the fixed electrode and the variable electrode displaced in response to the acceleration applied to the own vehicle and constituting the airbag acceleration sensor 7 as illustrated in FIG. 5, and is used to increase the voltage value allocated in response to the electrostatic capacity of the airbag acceleration sensor 7 when the calculation yaw rate is calculated by the yaw rate calculation unit 1a.

Returning to FIG. 30, the DSS computer 1 further increases the information capacity in the ECU process allocated to the signal of the airbag acceleration sensor 7 as the collision detection sensor (step S5020). For example, in step S5020, the DSS computer 1 may perform a parallel process of increasing the allocation information capacity by switching the sensor voltage at the ECU to the multi-port input or may perform a serial process of increasing the information capacity by the division based on a temporal process. In this way, the capacity increasing unit 1g of the DSS computer 1 increases the information capacity allocated to the yaw rate calculation unit 1a in the electronic control unit (ECU) constituting the yaw rate calculation unit 1a. Subsequently, the present control is terminated.

As described above, in the embodiment, the yaw rate sensor 9 mainly used to detect the behavior in the normal traveling state and the airbag acceleration sensor 7 mainly used to detect a behavior in the event of the collision have a large difference in resolution therebetween. Therefore, when the parallel sensing process is needed due to the non-collision prevention state, the DSS computer 1 increases the drive voltage from the normal state and temporally or mechanically increases the allocation information capacity at the ECU. In this way, since the drive voltage is increased and the information capacity to be processed at the ECU is increased, the resolution of the airbag acceleration sensor 7 is improved. Accordingly, it is possible to realize the controllable and stable control with a resolution close to the normal traveling state by the yaw rate in the event of the collision.

REFERENCE SIGNS LIST

1 DSS computer
1a Yaw rate calculation unit
1b Yaw rate determination unit
1c Yaw rate reliability determination unit
1d Collision position prediction unit
1e Acceleration reliability determination unit
1f Voltage control unit
1g Capacity increasing unit
1h Movement control unit 2 Milli-wave radar sensor
3 Camera sensor
4 Clearance sonar sensor
5 Brake ECU
6 Airbag ECU
7 Airbag acceleration sensor
8 Wheel speed sensor
9 Yaw rate sensor
10 Steering sensor
11 Power management ECU
12 Power steering ECU

The invention claimed is:

1. A vehicle movement state determination device comprising:
   a yaw rate sensor configured to detect a yaw rate generated in an own vehicle;
   an acceleration sensor configured to detect an acceleration generated in the own vehicle and is a sensor different from the yaw rate sensor;
   a yaw rate calculation unit configured to calculate the yaw rate generated in the own vehicle based on the acceleration detected by the acceleration sensor;
   a yaw rate determination unit configured to determine the yaw rate generated in the own vehicle based on at least one of a detection yaw rate detected by the yaw rate sensor and a calculation yaw rate calculated by the yaw rate calculation unit;
   a yaw rate reliability determination unit configured to determine whether a reliability of the detection yaw rate is low, the yaw rate reliability determination unit determining the reliability of the detection yaw rate is low when a collision between the own vehicle and an obstacle outside the vehicle occurs;
   a collision position prediction unit configured to predict a collision position on the own vehicle colliding with the obstacle; and
   an acceleration reliability determination unit configured to determine an acceleration sensor of which reliability of the detected acceleration decreases based on the collision position predicted by the collision position prediction unit, wherein
   the yaw rate determination unit determines the detection yaw rate as the yaw rate generated in the own vehicle at the time the yaw rate reliability determination unit does not determine that the reliability of the detection yaw rate is low, and determines the yaw rate based on the calculation yaw rate at the time the yaw rate reliability determination unit determines that the reliability of the detection yaw rate is low,
   wherein the yaw rate reliability determination unit is a collision determination unit configured to determine presence or absence of a collision between the own vehicle and an obstacle outside the vehicle, and the yaw rate determination unit determines the detection yaw rate as the yaw rate generated in the own vehicle at the time the collision determination unit does not determine that the collision occurs, and determine the yaw rate based on the calculation yaw rate at the time the collision determination unit determines that the collision occurs, and
   wherein the yaw rate calculation unit calculates the yaw rate generated in the own vehicle as the calculation yaw rate based on the acceleration detected by the acceleration sensor which is not determined as the acceleration sensor of which the reliability of the detected acceleration decreases by the acceleration reliability determination unit.

2. The vehicle movement state determination device according to claim 1, wherein the collision determination unit determines presence or absence of the collision based on the acceleration detected by the acceleration sensor.

3. The vehicle movement state determination device according to claim 1, wherein
   the acceleration sensor includes at least a fixed electrode and a variable electrode displaced in response to the acceleration applied to the own vehicle, and
   the vehicle movement state determination device further comprises:
   a voltage control unit configured to detect an acceleration in response to a change in an electrostatic capacity of one of the fixed electrode and the variable electrode not applied with a drive voltage, at the time the drive voltage is applied to one of the fixed electrode and the variable electrode constituting the acceleration sensor, and increases a voltage value allocated in response to the electrostatic capacity of the acceleration sensor, at the time the calculation yaw rate is calculated by the yaw rate calculation unit.

4. The vehicle movement state determination device according to claim 1, further comprising:
   a capacity increasing unit configured to increase an information capacity allocated to the yaw rate calculation unit in an electronic control unit constituting the yaw rate calculation unit.

5. A vehicle movement control device comprising:
   a movement control unit configured to perform a movement control of the own vehicle based on a yaw rate determined by a yaw rate determination unit of a vehicle movement state determination device, the vehicle movement state determination device including:
   a yaw rate sensor configured to detect a yaw rate generated in an own vehicle;
   an acceleration sensor configured to detect an acceleration generated in the own vehicle and is a sensor different from the yaw rate sensor;
   a yaw rate calculation unit configured to calculate the yaw rate generated in the own vehicle based on the acceleration detected by the acceleration sensor;
   the yaw rate determination unit configured to determine the yaw rate generated in the own vehicle based on at least one of a detection yaw rate detected by the yaw rate sensor and a calculation yaw rate calculated by the yaw rate calculation unit;
   a yaw rate reliability determination unit configured to determine whether a reliability of the detection yaw rate is low, the yaw rate reliability determination unit determining the reliability of the detection yaw rate is low when a collision between the own vehicle and an obstacle outside the vehicle occurs;
   a collision position prediction unit configured to predict a collision position on the own vehicle colliding with the obstacle; and
   an acceleration reliability determination unit configured to determine an acceleration sensor of which reliability of the detected acceleration decreases based on the collision position predicted by the collision position prediction unit, wherein
   the yaw rate determination unit determines the detection yaw rate as the yaw rate generated in the own vehicle at the time the yaw rate reliability determination unit does not determine that the reliability of the detection yaw rate is low, and determines the yaw rate based on the calculation yaw rate at the time the yaw rate reliability determination unit determines that the reliability of the detection yaw rate is low, wherein the yaw rate reliability determination unit is a collision determination unit configured to determine presence or absence of a collision between the own vehicle and an obstacle outside the vehicle, and the yaw rate determination unit determines the detection yaw rate as the yaw rate generated in the own vehicle at the time the collision determination unit does not determine that the collision occurs, and determine the yaw rate based on the calculation yaw rate at the time the collision determination unit determines that the collision occurs, and wherein the yaw rate calculation unit calculates the yaw rate generated in the own vehicle as the calculation yaw rate based on the acceleration detected by the acceleration sensor which is not determined as the acceleration sensor of which the reliability of the detected acceleration decreases by the acceleration reliability determination unit.

* * * * *